US008412605B2

(12) United States Patent
Griffin et al.

(10) Patent No.: US 8,412,605 B2
(45) Date of Patent: *Apr. 2, 2013

(54) COMPREHENSIVE SUSPICIOUS ACTIVITY MONITORING AND ALERT SYSTEM

(75) Inventors: Maura Louise Griffin, Atlanta, GA (US); Mary Palmer Harman, Darien, CT (US); Robert George Shiflet, Jr., Kennett Square, PA (US); Teresa Hegdahl Stigler, San Francisco, CA (US); David G. Turner, Wilmington, DE (US); Donna Dee Turner, Huntersville, NC (US)

(73) Assignee: Bank of America Corporation, Charlotte, NC (US)

( * ) Notice: Subject to any disclaimer, the term of this patent is extended or adjusted under 35 U.S.C. 154(b) by 55 days.

This patent is subject to a terminal disclaimer.

(21) Appl. No.: 12/916,234

(22) Filed: Oct. 29, 2010

(65) Prior Publication Data

US 2011/0131123 A1    Jun. 2, 2011

Related U.S. Application Data

(60) Provisional application No. 61/265,683, filed on Dec. 1, 2009.

(51) Int. Cl.
  G06Q 40/00     (2012.01)
  G06Q 20/00     (2012.01)
  G05B 19/00     (2006.01)
(52) U.S. Cl. .............. 705/35; 705/44; 705/76; 340/5.81
(58) Field of Classification Search ............... 705/35, 705/38, 44, 76; 340/5.81
See application file for complete search history.

(56) References Cited

U.S. PATENT DOCUMENTS

| | | | |
|---|---|---|---|
| 6,658,393 B1 | 12/2003 | Basch et al. | |
| 2003/0120586 A1 | 6/2003 | Litty | |
| 2004/0153650 A1 | 8/2004 | Hillmer | |
| 2004/0153663 A1* | 8/2004 | Clark et al. | 713/200 |
| 2004/0245330 A1 | 12/2004 | Swift et al. | |
| 2005/0080701 A1 | 4/2005 | Tunney et al. | |
| 2006/0089905 A1* | 4/2006 | Song et al. | 705/39 |
| 2006/0116898 A1 | 6/2006 | Peterson | |
| 2006/0282660 A1 | 12/2006 | Varghese et al. | |
| 2007/0174214 A1* | 7/2007 | Welsh et al. | 705/405 |
| 2008/0077474 A1 | 3/2008 | Dumas et al. | |
| 2008/0103800 A1 | 5/2008 | Domenikos et al. | |

(Continued)

OTHER PUBLICATIONS

International Search Report and the Written Opinion of the International Searching Authority mailed Jan. 24, 2011 for International Application No. PCT/US 10/58380.

(Continued)

*Primary Examiner* — Kenneth Bartley
(74) *Attorney, Agent, or Firm* — Michael A. Springs; Moore & Van Allen, PLLC; James C. Edwards

(57) ABSTRACT

Embodiments of the present invention relate to systems, apparatus, methods and computer program products for integrated risk management. More specifically, embodiments of the present invention provide for monitoring financial institution data from a plurality of financial institutions, including transactional data associated with multiple products and channels, to identify suspicious activity potentially associated with identity theft incidents and, in specific embodiments, communicate suspicious activity and/or identity theft alerts and/or reports in response to identifying the suspicious activities and/or confirming an identity theft incident associated with the suspicious activity. In further embodiments, the monitored financial institution may include one or more, and in some embodiments all of, account data, asset data, liability data, negative file data, customer data, device data, credit data, or biometric data. In addition, in certain embodiments, the monitored data may include non-financial institution data.

63 Claims, 8 Drawing Sheets

U.S. PATENT DOCUMENTS

| | | | |
|---|---|---|---|
| 2008/0103972 A1* | 5/2008 | Lanc | 705/44 |
| 2008/0140576 A1 | 6/2008 | Lewis et al. | |
| 2008/0294541 A1 | 11/2008 | Weinflash et al. | |
| 2008/0319922 A1 | 12/2008 | Lawrence et al. | |
| 2009/0106846 A1 | 4/2009 | Dupray et al. | |
| 2009/0248560 A1 | 10/2009 | Recce et al. | |
| 2009/0248573 A1 | 10/2009 | Haggerty et al. | |
| 2011/0066547 A1* | 3/2011 | Clark et al. | 705/38 |

OTHER PUBLICATIONS

International Search Report and the Written Opinion of the International Searching Authority mailed Jan. 24, 2011 for International Application No. PCT/US 10/58403.

International Search Report and the Written Opinion of the International Searching Authority mailed Jan. 24, 2011 for International Application No. PCT/US 10/58414.

International Search Report and the Written Opinion of the International Searching Authority mailed Jan. 31, 2011 for International Application No. PCT/US 10/58409.

International Bureau of WIPO. PCT International Preliminary Report on Patentability and Written Opinion dated Jun. 5, 2012. PCT International Application No. PCT/US2010/058380. Name of Applicant: Bank of America Corporation. English Language. 9 pages.

International Bureau of WIPO. PCT International Preliminary Report on Patentability and Written Opinion dated Jun. 5, 2012. PCT International Application No. PCT/US2010/058403. Name of Applicant: Bank of America Corporation. English Language. 7 pages.

International Bureau of WIPO. PCT International Preliminary Report on Patentability and Written Opinion dated Jun. 5, 2012. PCT International Application No. PCT/US2010/058409. Name of Applicant: Bank of America Corporation. English Language. 10 pages.

International Bureau of WIPO. PCT International Preliminary Report on Patentability and Written Opinion dated Jun. 5, 2012. PCT International Application No. PCT/US2010/058414. Name of Applicant: Bank of America Corporation. English Language. 10 pages.

* cited by examiner

COMPREHENSIVE SUSPICIOUS ACTIVITY MONITORING AND ALERT SYSTEM

CLAIM OF PRIORITY UNDER 35 U.S.C. §119

The present Application for Patent claims priority to Provisional Application No. 61/265,683 entitled "Integrated Fraud and Customer Data Network" filed Dec. 1, 2009, and assigned to the assignee hereof and hereby expressly incorporated by reference herein.

FIELD

In general, embodiments of the invention relate to systems, methods and computer program products for risk management and, more particularly monitoring for suspicious activity across multiple financial institutions and multiple products and channels within the financial institutions, to identify suspicious activity potentially associated with identity theft incidents and, in some embodiments, communicate alerts in the event of identification of a suspicious activity and/or a confirmed identity theft incident.

BACKGROUND

Risk may be defined in a business environment as an event, situation or condition that may occur and if it occurs, will impact the ability of a business to achieve its desired objectives. Risk management involves (1) defining those events, situations or conditions and the potential impact to the business, customers and the like; (2) the ability to detect those defined events when they occur; (3) when detected, executing a pre-defined set of actions to minimize negative impacts based upon the level of threat and customer impact of mitigation alternatives (e.g., risk mitigation, prevention and the like); and (4) when unable to prevent a risk event from negatively impacting, executing a set of actions to recover all or part of the loss. In some cases, recovery includes supporting the legal process in criminal prosecution and civil actions.

In the financial world, risk management is necessary in various aspects of the business. Financial institutions manage various forms of risk. One such risk is credit risk, which is a risk related to the inability of a customer, client or other party to meet its repayment or delivery obligations under previously agreed upon terms and conditions. Credit risk can also arise from operational failures that result in an advance, commitment or investment of funds. Another financial risk is market risk, the risk that values of assets and liabilities or revenues will be adversely affected by changes in market conditions, such as market movements or interest rates. Additional forms of risk are financial crimes, including fraud. Fraud involves the use of another person's or company's identity or financial accounts without their permission for the purpose of financial gain. Examples of fraud include identity theft, mass compromises, phishing, account takeover, counterfeit debit or credit cards, etc. Other financial crimes involve using the financial system to enable or hide criminal activity. These include activities like money laundering; terrorist financing, financial transactions with countries or companies that are prohibited by law (e.g., boycotted/sanctioned countries, etc.)

Financial institution fraud, otherwise referred to as bank fraud, is a term used to describe the use of fraudulent means to obtain money, assets, or other property owned or held by a financial institution and/or the financial institution's customers. While the specific elements of a particular banking fraud law vary between jurisdictions, the term "bank fraud" applies to actions that employ a scheme or artifice, as opposed to bank robbery or theft. For this reason, bank fraud is sometimes considered a white collar crime. Examples of bank fraud include, but are not limited to, check kiting, money-laundering, payment/credit-card fraud, and ancillary frauds such as identification theft, phishing and Internet fraud and the like.

In addition to bank fraud, other financial institution business activity may rise to the level of suspicious activity that may be associated with other criminal acts or activities. In this regard, the suspicious activity, if identified, may be instrumental in identifying criminals, the location of criminals or other information pertinent to criminal activity, such as telephone numbers, Internet Protocol (IP) addresses and the like. These suspicious activities may include, but are not limited to, bank transactions, such as deposits, withdrawals, loan transactions and the like; credit card transactions; online banking activity such as compromised online banking IDs and the like; electronic commerce activity; call center activity and the like. Additionally suspicious activity may be determined from data related to computer security violators (i.e., hackers), fraudulent telephone calls, and entities associated with divisive computer programs (e.g., viruses, trojans, malware and the like) and the like.

In many instances, financial institutions have difficulty identifying ongoing bank fraud or other nefarious activities until the fraud or crime has escalated to a level that has serious negative financial impact. Further, by the time a defrauded financial institution discovers the fraudulent activity, the perpetrator has oftentimes moved on to another financial institution. In some instances, in addition to moving on to a different financial institution, the perpetrator moves on to a different scheme using a different financial product. For example, if a particular perpetrator commits checking fraud against a savings bank, then the savings bank, upon discovering the fraud, will likely report the checking fraud to an organization that collects data on checking fraud. However, if the same perpetrator later attempts to commit credit-card fraud against a credit-card institution, the credit-card institution will be unaware of the perpetrator's previous act of checking fraud.

Risk assessments in the credit realm are undertaken to determine if a customer or a potential customer is credit-worthy, i.e., if credit should be extended or curtailed. Currently such risk or credit assessments are conducted by credit bureaus. However, credit bureaus are limited in the information that they have access to in making such assessments. Specifically, credit bureau information is limited to credit related information, such as extended credit lines, payment history, and the like. Absent from the credit bureau determination is other meaningful financial information, such as transactional information that assesses a customer's behaviors, for example, checking transactions, credit/debit card transactions, Automated Teller Machine (ATM) deposits/withdrawals, cash advances and the like. Also absent from the credit bureau determination are information regarding the assets the customer has, such as deposit and investment account balances and the like. In addition to assessing risk when credit is issued, a need exists to assess risks throughout the entire credit lifecycle including, but not necessarily limited to, credit distribution, repayment of credit and the like.

Therefore, from a credit risk assessment perspective, a need exists to develop a system that is not limited to assessing credit-worthiness based solely on credit information, and in some instances, additional account information. The desired system should provide for assessing a customer's behavior in terms of their transaction data, across multiple financial institutions and multiple products within the financial institutions, as well as non-financial institution information, in order to obtain a comprehensive picture of a customer's transaction history, as well as historical behaviors, in order to accurately assess the customer's current behaviors. From a fraud risk perspective, a need exists to monitor and otherwise identify individuals or other entities that are likely to commit fraud across multiple financial products, across multiple channels and across multiple financial institutions, as well as to identify when customers are being victimized by dishonest individuals or fraud rings.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, apparatus, methods, and computer program products for risk management. Moreover, embodiments of the present invention provide for provide for monitoring financial institution data from a plurality of financial institutions, including transactional data associated with a plurality of financial institution products and financial institution channels, to identify the likelihood of an identity theft incident and, in specific embodiments, communicate suspicious activity and/or identity theft alerts and/or reports in response to identifying suspicious activity potentially or confirmed to be associated with identity theft incidents.

An apparatus for risk management provides for embodiments of the present invention. The apparatus includes a computing platform including at least one processor and a memory. The apparatus further includes a risk database stored in the memory and configured to receive financial institution data, from a plurality financial institutions. The financial institution data includes transaction data associated with a plurality of financial institution products and a plurality of financial institution channels. In addition, the apparatus includes a suspicious activity monitoring routine stored in the memory, executable by the processor and configured to analytically monitor the financial institution data to identify a suspicious activity, potentially associated with an identity theft incident.

In specific embodiments of the apparatus, the risk database is further configured to receive the financial institution data, including one or more of customer account data, such as account opening data and account closing data; asset data, such as deposit data and investment data; liability data, such as outstanding credit data, credit limit data and credit payment data; customer data and/or biometric data.

In further specific embodiments of the apparatus, the risk database is further configured to receive non-financial institution data from one or more non-financial institution entities. In such embodiments, the suspicious activity monitoring routine is further configured to analytically monitor the non-financial institution data to identify suspicious activity potentially associated with an identity theft incident. The non-financial institution entities may include, but are not limited to, merchants, government agencies, telephone service providers or Internet service providers and the like. The non-financial institution data may include, but is not limited to, transaction data; product data; channel data; account data; credit data; asset data; device data, such as, Internet Protocol (IP) address, type of device, serial number, device features/specifications and the like; or biometric data. In still further specific embodiments, the risk database is further configured to receive at least a portion of the financial institution data and/or at least a portion of the non-financial institution data from one or more data aggregators.

In further embodiments of the apparatus, the risk database is further configured to receive from financial institutions, and in some embodiments from non-financial institutions and/or data aggregators, negative file data. In addition, in some embodiments, the risk database also stores risk patterns that have been determined to be correlated with suspicious activity and/or identity theft incidents.

In still further embodiments of the apparatus, the suspicious activity monitoring routine is further configured to receive an identity theft query from at least one of a financial institution, non-financial institution entity or a customer and determine whether a queried one of a transaction, a behavior, a person or an entity represents a likely identity theft incident. In other related embodiments of the apparatus, the suspicious activity monitoring routine is further configured to receive an identity validation query from at least one of a financial institution, a non-financial institution entity or a customer and validate the identity of a person or entity based on the identity validation query.

In other embodiments of the apparatus, the suspicious activity monitoring routine is further configured to generate and initiate communication of a suspicious activity and/or identity theft alert based on an identified suspicious activity or confirmation of an identity theft incident. In further embodiments of the apparatus, the suspicious activity monitoring routine is further configured to generate and initiate communication of a suspicious activity and/or identity theft report based on one or more identified suspicious activities potentially associated with identity theft incidents and/or confirmation of an identity theft incident. In specific embodiments, the suspicious activity alert, identity theft alert, suspicious activity report or identity theft report may be communicated to one or more of financial institutions, non-financial institutions or customers.

A method for risk assessment and management provides further embodiments of the invention. The method includes receiving, at a risk database stored in computing device memory, financial institution data from a plurality of financial institutions, including transaction data associated with a plurality of financial institution products and a plurality of financial institution channels. The method further includes monitoring, via a computing device processor, the risk database to identify a suspicious activity potentially associated with an identity theft incident. Additionally, the method includes initiating, via a computing device processor, a risk management action in response to a suspicious activity and/or confirmation of an identity theft incident.

In specific embodiments of the method, receiving further includes receiving the financial institution data, including one or more of customer account data, such as account opening data and account closing data; asset data, such as deposit data and investment data; liability data, such as outstanding credit data, credit limit data and credit payment data; customer data; and/or biometric data.

In further specific embodiments of the method, receiving further includes receiving non-financial institution data from one or more non-financial institution entities and monitoring further includes monitoring the non-financial institution data to identify suspicious activities potentially associated with an identity theft incident. In related embodiments, the non-financial institution entities include one or more of merchants, government agencies, telephone service providers, Internet service providers. In other related embodiments, the non-financial institution data, includes at least one of transaction data, product data, channel data, account data, credit data, asset data, customer data, device data, such as IP address, location-determining (e.g., GPS) data or the like, or biometric data. In still other related embodiment of the method, receiving further includes receiving, at the risk database stored in computing device memory, at least a portion of the financial institution data and/or at least a portion of the non-financial institution data from one or more data aggregators.

In further specific embodiments the method further includes receiving an identity query from at least one of a financial institution, a non-financial institution entity or a customer and determining whether a queried one of a transaction, a behavior, a person or an entity represents a likely identity theft incident. In further specific embodiments the method further includes receiving an identity validation query from at least one of a financial institution, a non-financial institution entity or a customer and validating the identity of a person or entity based on the identity validation query.

In other specific embodiments of the method initiating further includes generating and initiating communication of a suspicious activity or identity theft alert based on an identified suspicious activity potentially associated with an identity theft incident or confirmed to be associated with an identity theft incident. In other embodiments of the method initiating further includes generating and initiating communication of a suspicious activity report or an identity theft report based on one or more identified suspicious activities potentially associated with identity theft incidents or confirmed to be associated with an identity theft incident. In such embodiments, generating may further include generating and initiating communication of the suspicious activity alert, identity theft alert and/or the reports to one or more of financial institutions, non-financial institutions or customers.

In other embodiments the method includes receiving, from one of the customer, a financial institution or a non financial institution, confirmation of identity theft based on verification that a customer account or identity has been proven compromised. In such embodiments the method may include, updating the risk database to reflect details of the identity theft. In some embodiments the method may include communicating identity theft confirmation alerts to one or more of predetermined financial institutions or predetermined non financial institutions.

In further embodiments of the method initiating a risk management action may further include generating and communicating a suspicious activity alert based on data in a negative file associated with a known customer. In further embodiments of the method, initiating a risk management action may further include generating and communicating a suspicious activity alert based on one or more deviations from a behavioral baseline score. In still further embodiments of the invention, initiating a risk management action may further include generating and communicating a suspicious activity alert based on risk patterns identified in a customer profile.

A computer program product including a computer-readable medium defines further embodiments of the invention. The computer-readable medium includes a first set of codes for causing a computer to receive financial institution data from a plurality financial institutions, including transaction data associated with a plurality of financial institution products and a plurality of financial institution channels. The computer-readable medium additionally includes a second set of codes for causing a computer to monitor the risk database to identify a likelihood of a suspicious activity incident. In addition, the computer-readable medium includes a third set of codes for causing a computer to initiate a risk management action in response to identification of suspicious activity potentially associated with an identity theft incident.

Thus, further details are provided below for systems, apparatus, methods and computer program products for monitoring financial institution data from a plurality of financial institutions, including transactional data associated with multiple financial institution products and channels, to identify suspicious activities potentially associated with identity theft incidents and, in specific embodiments, communicate suspicious activity alerts and/or identity theft alerts and/or associated reports in response to suspicious activity or confirmation of an identity theft incident. In further embodiments, the monitored financial institution may include one or more, and in some embodiments all of, account data, asset data, liability data, credit data, or biometric data. In addition, in certain embodiments the monitored data may include non-financial institution data from one or more non-financial institutions.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Reference will now be made to the accompanying drawings, which are not necessarily drawn to scale, and wherein.

DETAILED DESCRIPTION OF EMBODIMENTS OF THE INVENTION

Figure 1:
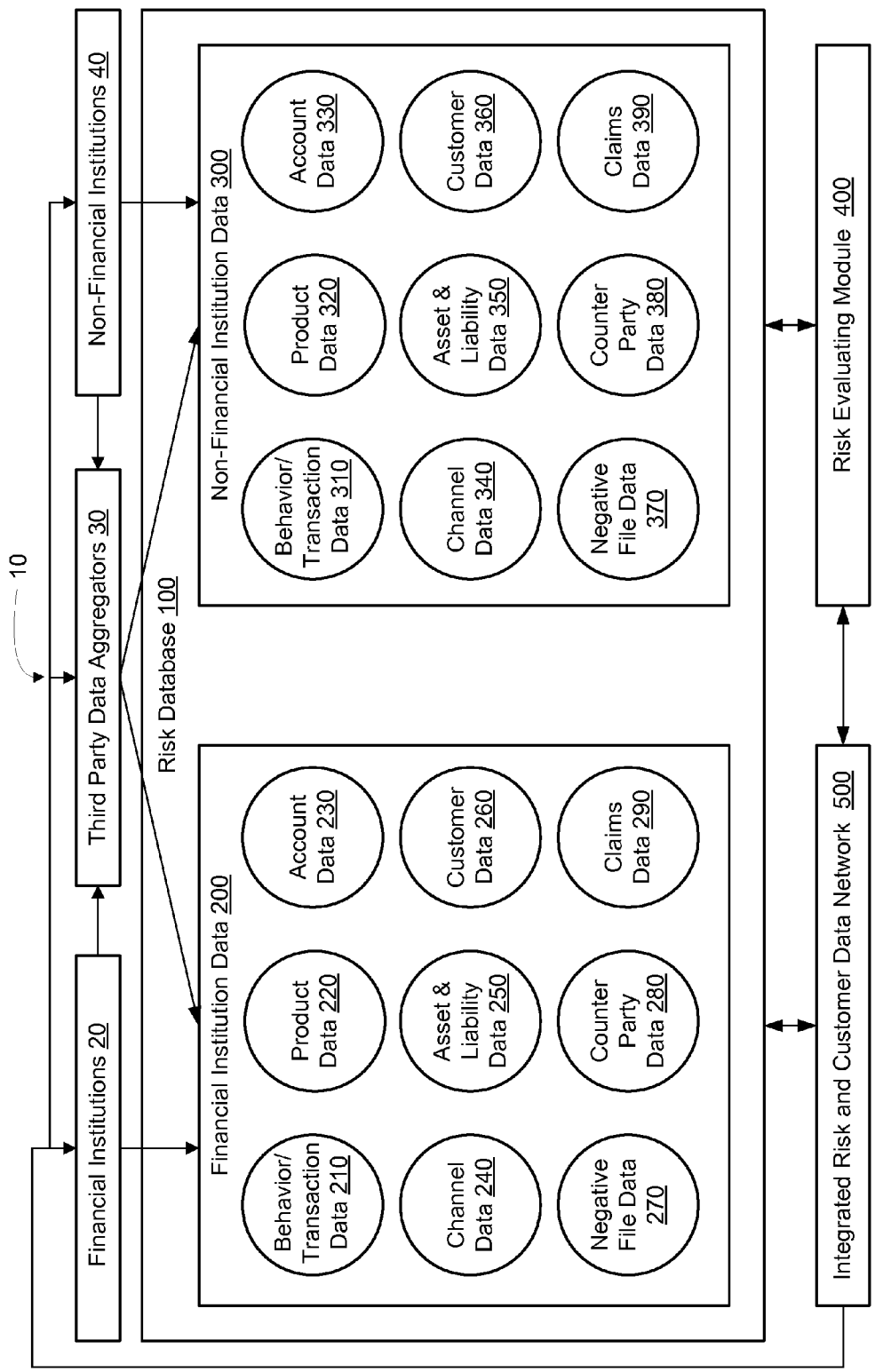
FIG. 1 is a block diagram of a system for collecting customers' personal and financial data across multiple financial products and channels from multiple financial institutions and non-financial institutions for the purpose of leveraging the collected data to manage risk, in accordance with an embodiment of the present invention.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident, however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments of the present invention, the functions described may be implemented in hardware, software, firmware, or any combination thereof. If implemented in software, the functions may be stored or transmitted as one or more instructions or code on a computer-readable medium. Computer-readable media includes both computer storage media and communication media, including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

In general, embodiments of the present invention relate to systems, methods and computer program products for collecting customers' financial data from multiple financial institutions, from multiple different communication channels, and across multiple financial products/services within the financial institutions. The collected data includes transactional level data, such as checking transactions, ATM transactions, and credit/debit card transactions that allow for determination of a customer's transactional behaviors. Additionally, the financial institution data includes account data, such as balances and the like, and customer data, such as personal data, demographics data and the like. In addition, customer related data may be collected from non-financial institutions, such as retailers (online and brick & mortar) government agencies, Internet Service Providers (ISPs), telephone companies (Telcos), health care industry entities, and the like. The non-financial information may provide for additional transactional information, such as the type of items purchased and the like, behavioral data, such as purchasing or browsing behaviors, and customer data.

For the purposes of this invention, a "financial institution" is defined as any organization in the business of moving, investing, or lending money, dealing in financial instruments, or providing financial services. This includes commercial banks, thrifts, federal and state savings banks, savings and loan associations, credit unions, investment companies, insurance companies and the like. A "customer" is defined as an individual or entity having an account or relationship with entities implementing the risk management system, and/or an individual or entity having an account or relationship with a financial institution or a non-financial institution supplying data to the entity implementing the risk management system of the present invention. A "counterparty" is defined as other individuals or entities (excluding the customer) involved in a transaction. A "transaction" can be monetary in nature (e.g., a purchase via a credit card; depositing a check in an account; a stock trade or the like) or non-monetary in nature (e.g., a telephone call; an encounter with a financial institution or non-financial institution associate/representative; an identity authentication process, such as a biometric identity authentication process; recorded use of a utility, such as electricity and the like).

The collected customer data is captured in a comprehensive centralized risk database that allows for analytics and/or logic to be performed on the data for the purpose of leveraging the collected data to determine the customer's behaviors and/or the customer's likely behaviors to thereby reduce risk.

In addition, according to specific embodiments, the comprehensive centralized risk database includes negative activity data that identifies the individuals or entities, including their demographics, transactions, products/accounts and the like, involved in fraud, criminal activity, defaults and other risky activities that can lead to financial loss. For fraud, examples of negative activity data elements include, but are not limited to, the names of fraud perpetrators; information associated with the perpetrators (e.g., aliases, addresses, telephone numbers, IP addresses and the like); information related to fraudulent and other activity across multiple industry products/services; identification of activities at the account and transaction level across both industry-related activities and non-industry related activities; and the like. Thus, the negative activity data is received from financial institutions and, in some embodiments of the invention, from non-financial institutions.

Further, embodiments of the invention leverage the collected data and the negative activity database for use in analytical analysis that provides a holistic view of each customer's financial behavior in order to manage and reduce risk.

In specific embodiments of the invention, the collected data is used to determine, for customers, customer segments, counterparties, etc., a behavioral baseline score that provides a holistic assessment of the customer's/customer segment's/counterparty's baseline, or normal financial behavior, for example, how and where a customer, customer segment or counterparty normally transacts, channels used, transaction amounts, average deposits maintained and the like. Once a behavioral baseline score has been determined, the score(s) may be communicated to designated parties. In addition, once a behavioral baseline score has been determined, continuous monitoring of the customer's/customer segment's/counterparty's collected data provides for determination of deviations from the baseline. Deviations from the baseline can be both positive and negative deviations, negative deviations indicating potentially risk inducing behavior and positive deviations indicating potentially risk reducing behaviors. In other embodiments, the behavioral baseline score may indicate that the customer/customer segment/counterparty exhibits risky behavior at their normal level, posing a constant or consistent risk, such as a credit risk, fraud risk or the like, even absent a deviation. In such instances, notifications and/or alerts may be communicated to designated parties based on abnormal deviations from the population baseline.

Embodiments of the present invention provide the collected data, as well as the behavioral baseline and risk scores, to financial institutions and/or non-financial institutions as a risk assessment tool that can be used alone or as an input into their own risk management systems. Examples where financial and non-financial institutions may use the collected data or the baseline or risk scores include, but are not limited to, determining whether to authenticate a transaction involving a particular account or customer, determining whether to issue credit to a particular customer, determining whether to open an account, and/or determining whether to conduct or expand business with a customer.

Additional embodiments of the invention provide for determining risk patterns and, in particular, new types of fraud or other new types of risk using the financial institution data, the non-financial institution data, the claims data, deviations from customer baselines and the negative file (e.g., risk activity and interactions) database to identify behaviors and patterns that are associated with loss due to risk. In related embodiments, the occurrences of risk patterns are monitored to provide for a health of industry risk indicator, such as a risk health score or the like, which indicates how well an entity, such as a company, an industry or a segment of the industry, is managing risk.

In addition, embodiments of the present invention provide for determining a risk score for customers, customer segments, customer populations, counterparties and the like that is associated with one or more risk types and is based on risk patterns and the combination(s), severity and frequency of risk patterns in a customer, customer segment, population, or counterparty's behaviors, transactions and networks as identified by using financial institution transactional data, claims data, and asset and liability data. In other embodiments, the risk score determination may take into account non-financial institution data, negative file data and the customer's/customer segment's/counterparty's network for any known high risk indicators. The risk score serves to predict the likelihood that doing business with a customer/segment/population or counterparty will result in loss due to risk.

Other embodiments of the invention provide for suspicious activity monitoring that leverages the use of the customer and transactional data across multiple financial institutions, multiple products/services within the financial institution and multiple financial institution channels. As such, the suspicious activity monitoring of the present invention includes account data, such as account opening and closing data; asset data, such as deposits and security investments; liability data, such as credit outstanding, payment status, credit limits and the like; biometric information and other behavior indicators to detect identity compromise.

Further, embodiments of the present invention provide the collected data to data-analytics providers, such as third-party data-analytics providers, so that the data-analytics providers can use the collected data when constructing models that model customers' behavior and when developing risk prevention and risk mitigation systems. The third-party data-analytics providers may develop and/or operate the behavioral baseline scoring, risk scoring, risk pattern and suspicious activity analytic models/services. It should be appreciated that a customer can be any individual or business, or non-business entity.

Also, for example, embodiments of the present invention authenticate whether an individual is who they say they are. As embodiments of the present invention gather financial transactions, demographic, retailer, computing device identification, Telco, biometric data in a single location, embodiments can provide for executing routines that authenticate an individual's identity—whether in-person or via phone or online/mobile. Accordingly, embodiments of the present invention provide a service whereby subscribers can use the service to authenticate individuals' identities. The service relies on knowing the customer's behaviors and other identifying characteristics about the customer based on information provided by financial institutions and non-financial institutions in combination with information provided by the entity implementing the risk management system, such as customer identifying information, e.g., social security number, taxpayer identification number, Global Positioning System (GPS), biometrics and the like and/or customer demographic information.

Referring to FIG. 1 a block diagram is depicted of a system 10 for aggregating and integrating risk-related data, in accordance with embodiments of the present invention. The system 10 includes a comprehensive centralized risk database 100, which is configured to collect or otherwise receive data across multiple financial products and multiple channels from multiple financial institutions for the purpose of managing risk related to credit, fraud and the like, in accordance with an embodiment of the invention. The system 10 includes a risk-evaluating module 400 that is configured to monitor or otherwise provide risk analysis on transaction data or other data received from various data repositories or databases associated with financial institutions, third-party data aggregators, and/or non-financial institutions. The risk-evaluating module 400 may be implemented by the risk management entity, such as a financial institution or a data aggregator, in alternate embodiments, the risk-evaluating module 400 may be implemented by one or more third-party entities (i.e., procured risk modeling).

The data in the risk database 100 may be communicated from and to financial institutions 20, third-party data aggregators 30 and/or non-financial institutions via integrated risk and customer data network 500. In addition, financial institutions 20, third-party data aggregators 40 and/or non-financial institutions may access integrated risk and customer data network 500 to implement the functionality of risk-evaluating module 400.

According to the illustrated embodiment, the centralized risk database 100 stores financial institution data 200. In additional embodiments, the centralized risk database 100 stores non-financial institution data 300. When evaluating customer risk and/or validating customer risk, the risk-evaluating module 400 receives and analyzes any and/or all financial institution data 200, and non-financial institution data 300. The data 200 and 300 will now be discussed in more detail.

According to some embodiments, customers' personal and financial data is provided to the system 10 by financial institutions 20, such as banks, credit-card companies, security investment companies and the like that hold a customer's checking, credit-card, and security investment accounts, and that have established financial relationships with the individual customers. It should be noted that unlike credit bureaus, which limit their inventory to liabilities, the risk database 100, and in particular financial institution data 200, of the present invention includes customer assets, as well as liabilities. The data received from multiple financial institutions is aggregated and stored as financial institution data 200, which is in electronic communication with the risk-evaluating module 400.

It should be noted that the various categories of data shown and described in relation to financial institution data 200 and non-financial institution data 300 may provide for overlap. For example, behavior/transaction data 210 may include product data 220 or channel data 240 or the like.

The financial institution data 200 may include, but is not limited to, behavior/transaction data 210. According to some embodiments, behavior/transaction data 210 includes data related to financial institution transactions, both inflow transactions (e.g., deposits) and outflow transactions (e.g., withdrawals) such as savings/checking account transactions; Automated Clearing House (ACH) transactions; debit card transactions; credit card transactions; mortgage loan transactions; other loan transactions, such as home equity loan transactions; investment transactions (e.g., sale or purchase of an investment vehicle) and the like.

The behavior/transaction data 210 also includes, according to some embodiments, credit card/debit card transaction data that includes data related to credit card or debit card purchases and payments, including date/time of purchases and store names and locations of where the purchases took place. In some embodiments of the invention, transaction data includes pre-purchase authorization requests that may be processed in advance of a payment transaction for certain types of purchases, such as, but not limited to, hotel and pay-at-the-pump gas debit card and credit card transactions.

Additionally, the behavior/transaction data 210 includes, for example, online-banking data that includes transaction data related to any online service, including but not limited to, bill pay transactions, electronic/online security trades, mobile transactions and the like. The online banking data may additionally include indications as to how often and when an online account is accessed, indications of erroneous attempts at accessing an online account, indications of simultaneous duplicate requests to access an online account and any other means of compromising the online banking account.

Behavior data may include any other data captured by the financial institution related to a customer behavior. For example, behavior data may be associated with a financial institution interaction that may not have risen to the transaction level, such as initiating but not completing an online transaction, an e-commerce transaction, an ATM transaction or a call center transaction or the like. In addition, behavior data may include statistical data surrounding transactions. For example, the frequency and times customers make calls to call centers, ATM transactions, e-commerce transactions, online transactions and the like. For the purposes of this invention, transaction data is defined to include behavior data.

In addition, behavior/transaction data 210 includes e-commerce data that includes transaction data related to purchases of products or services made electronically, such as via a financial institution website or the like.

The financial institution data 200 may also include product data 220 that indicates the financial institution product associated with the customer behavior and/or customer transaction. Financial institution products may include, but are not limited to, a checking account, a savings account, a debit card/account, a credit card/account, an investment product/account or the like. As previously noted, part or all of the product data 220 may be included in the behavior/transaction data 210 or the risk database may be configured to implement a separate file for the product data 220.

The financial institution data 200 may also include account data 230 that indicates the customer's financial institution account associated with the customer's behavior/transaction. Financial institution accounts may include, but are not limited to, checking accounts, savings accounts, credit card accounts, debit card accounts, credit accounts, loan accounts, investment accounts and the like. Account data 230 may additionally include account/status data, such as open, new, closed, suspended, balances, over charges, freezes, investment account balances, loan credit outstanding, credit limits, past due/defaults, and the like.

As previously noted, part or all of the account data 230 may be included in the behavior/transaction data 210 and/or product data 220 or the risk database may be configured to implement a separate file for the account data 230.

In addition, the financial institution data 200 may also include channel data 240 that indicates the source of the customer behavior/transaction. Financial institution channels may include, but are not limited to, the financial institution retail outlet, electronically (e.g., direct deposit or bill pay), online/mobile or via a call center, or that a transaction occurred at a retail location, online or by phone. As previously noted, part or all of the channel data 240 may be included in the behavior/transaction data 210 or the risk database may be configured to implement a separate file for the channel data 240. Additionally, the channel data 240 may include call center data that may include transaction data from a plurality of call centers across a plurality of financial institutions. Also, the channel data 240 may include ATM data that includes transaction data from a plurality of ATMs across a plurality of financial institutions. The ATM data may include the frequency and times customers use ATMs, as well as the nature of the ATM transaction.

Moreover, the financial institution data 200 may include asset and liability data 250. The asset data may include, but is not limited to, deposit and investment status information;

investment and deposit balances, investment values, equity value of real estate, indications of liquidity (e.g., CD maturity dates) and the like. The liability data may include credit outstanding, credit limits, payment status data, payoff dates and the like.

In addition, the financial institution data 200 may include customer data 260 that indicates personal data, demographics data and any other customer data associated with accounts or products. Customer data 260 may additionally include scores derived from the data in the risk database 100, such as behavioral baseline and risk scores and the like. It may also include any risk indicators from data collected in the account data 230 or negative file data 270 regarding a customer or their related information (e.g., number of overspent costs over a time period, bad address, and the like). As previously noted, part or all of the customer data 260 may be included in the the risk database may be configured to implement a separate file for the customer data 260.

Further, according to specific embodiments, the financial institution data 200 may include negative file data 270 which includes identifying data related to historical/known risk activities. In specific embodiments, the financial institution negative file data 270 may be financial industry-wide negative file data or the like. Thus, the negative file data 270 may be received from multiple financial institutions 20 or from third-party data aggregators 30. It should be noted that in specific embodiments negative file data 270 may be received from entities that are not otherwise contributors to the risk database 100. Additionally, negative file data 270 includes, but is not limited to, fraudulent or other risk activity related to multiple products and/or services and multiple channels for delivering the products/services.

The negative file data 270 provides for multiple financial institutions and in some specific embodiments of the invention, all financial institutions, and in some embodiments, nonfinancial institutions to access the negative file data 270 for purposes of determining historical risk activities and information related to the activities. In some embodiments of the invention, the negative file is used to determine the accuracy of information provided to the entity by a customer. The negative file data 270 may subsequently be used to determine risk patterns, monitor suspicious activity and/or other risk related activities. The negative file data 270 may include, but is not limited to, the name(s) of the high risk individuals and entities (e.g., fraud perpetrators, criminals, rings, suspected terrorists, money launderers, criminal watch lists, defaulters, companies having filed liquidation companies with debt status below investment grade and the like), addresses, telephone numbers, social security numbers, IP addresses, device identifiers/prints, such as Subscriber Identity Module (SIM) number or the like, biometric data, such as fingerprint data, voice data or the like, associated with the perpetrators and the like. The negative file may also indicate if these data elements belong or are associated with the perpetrator(s), or have been illegitimately used by the perpetrator(s). Additionally, negative file data 270 may include suspicious account data, otherwise referred to as compromised-account data, which includes counterfeited accounts, data related to computer security violators (i.e., hackers) or the like. Additionally, according to some embodiments, the suspicious- account data includes data related to fraudulent telephone calls and/or a counter-fraud intelligence platform that provides information related to viruses, trojans, malware and the like. In addition, the negative file data 270 may, in some embodiments, include information regarding defaults, liquidations and the like.

The negative file data 270 may, in specific embodiments, include mined data obtained from financial institutions that is used to identify suspicious activity or items, such as accounts, applications or the like, linked to elements within the negative file data 270. Once the linked items have been identified, the financial institutions or non-financial institutions may be electronically notified or otherwise alerted. For example, if an existing customer's phone number has been used in a fraud scam, the financial institutions that have the customer and phone number on record in the risk database 100 would receive an alert that the phone number had been used fraudulently.

The financial institution data 200 may additionally include counterparty data 280. A "counterparty" is defined herein as the parties involved in a transaction with the customer. Counterparty data 280 may include, but is not limited to, data related to customer transactions that is specific to the counterparty and is not typically reported to the financial institution, such as items/services provided in the transaction and the like. Additionally, counterparty data 280 includes identifying characteristics of the counterparties such as name, location, merchant number, parent company and the like. In some embodiments, this file contains the list of payment processors and the merchants they service. Additionally, in some embodiments, the counterparty data 280 is augmented with data regarding the counterparty that can be obtained from the customer data 260 and/or 360 as well as claims data 290 and/or 390. In other instances, the customer data 260, 360 or the claims data 290, 390 may be augmented with data regarding the counterparty from the counterparty data 380. Additionally, counterparty data 280 may include overall statistics associated with the counterparty that are relevant to risk determination.

The financial institution data 200 may also include claims data 290 that includes fraud and non-fraud claims made by the customer or the counterparty. The claims data 290 is across multiple financial institution products, multiple financial institution channels and multiple different financial institutions. The claims data 290 may be implemented in conjunction with behavior/transaction data 210 for risk detection, such as mass compromises, merchant customers whose profitability is compromised by high claim rates or the like.

According to some embodiments, third-party data aggregators 30 may provide data to the risk database 100. Third-party data aggregators 30 are organizations that collect data from multiple institutions, both financial institutions and non-financial institutions, and then organize and resell the collected data. The data aggregator data may, in some embodiments, be used to supplement data provided by financial institutions as a means of further understanding the customer and the customer's behaviors. The data provided by third-party data aggregators 30 may, according to specific embodiments, be collected, tagged or otherwise identified within the risk database 100 based on the data aggregator source and stored with associated customer data, associated account data and/or in one or more distinct data aggregator files. Data aggregators are often used as an efficient means of collecting data. In other embodiments of the invention, data aggregators may be used for the value-added insights or analytics provided. This modeled data can be used in addition to data collected by financial institutions and non-financial institutions (e.g., credit bureau data including FICO scores, commercial segmentation scores) or to fill gaps possibly caused by lack of participation by one or more financial or non-financial institutions (e.g., customer segmentation and marketing data on investible assets).

According to some embodiments, the third-party data aggregators 30 are Consumer Reporting Agencies ("CRAs"), otherwise referred to as credit reporting agencies, or the like. Typically, CRAs collect personal and liability information about individual consumers, generate credit reports to indicate the creditworthiness of individual consumers, and offer these credit reports to prospective creditors. More specifically, CRAs collect personal and financial information about individual consumers from a variety of sources called data furnishers. These data furnishers are typically institutions that have had financial relationships with individual consumers. For example, data furnishers may be creditors, lenders, utility companies, debt collection agencies, government agencies, and courts. Data furnishers report data regarding individual consumers to CRAs, and, based on the received data, CRAs generate a credit report for each individual consumer. A typical credit report contains detailed information about an individual consumer's credit history, including credit accounts and loans, bankruptcies, late payments, and recent inquiries. These credit reports also contain a credit score, which is a measure of credit risk calculated using the information provided in the credit report.

According to some embodiments, non-financial institutions 40, such as merchants, retailers, utility companies, social networks, government agencies and the like provide non-financial institution data 300 to the risk database 100. The data received from non-financial institutions 40 may, in some embodiments, be collected and stored as non-financial institution data 300, which is distinct from the financial institution data 200, is in electronic communication with the risk-evaluating module 400. The non-financial institution data 300 further includes customer identification data and provides insight into customer behaviors and interactions.

In some embodiments, non-financial institution data 300 includes behavior/transaction data 310. According to some embodiments, behavior/transaction data 310 includes data related to financial transactions, such as non-financial institution credit account transactions; Point-Of-Sale (POS) transactions and the like. The data may include, but is not limited to, details of the purchase (e.g., amount of electricity consumed, detailed POS receipt listing items purchased and the like), date/time of purchases/usages and seller's names and locations of where the purchases took place.

Additionally, the behavior/transaction data 310 includes, for example, online-non-financial data that includes transaction data related to any online transactions and the like.

In addition, behavior/transaction data 310 includes e-commerce data that includes transaction data related to purchases of products or services made electronically, such as via a merchant website or the like. In addition, behavior/transaction data 310 may include behavior data. In this regard, retailers, in particular, online retailers, such as Retail Store A_search engines or the like, collect and may provide purchase behavior and browsing data, which may include browsing data related to purchases or interaction with the online site. In addition, telephone companies may provide transaction in the form of telephone call data, e.g., to whom calls were made, from whom calls were received, length of calls, location-determining data, calling patterns and the like. Data from Telcos and, alternatively Post Offices enable verification of active and/or credible telephone numbers and/or addresses.

Internet Service Providers (ISPs), search engines and social networks may provide behavior/transaction data 310, in the form of browsing history, contact/friend lists, email behavior, purchase transaction data, including applications purchased and/or used, download data and the like. Additionally, behavior/transaction data 310 may include health care industry data, such as, but not limited to, health care records, Medicaid claims, and the like.

The non-financial institution data 300 may also include product data 320 that indicates the non-financial product associated with the customer behavior and/or customer transaction. Non-financial institution products may include, but are not limited to, email service, wireline phone service, electricity, home improvement products, online books or the like. As previously noted, part or all of the product data 320 may be included in the behavior/transaction data 310 or the risk database may be configured to implement a separate file for the product data 320. The non-financial institution data 300 may also include account data 330 that indicates the customer's non-financial institution account associated with the customer's behavior/transaction. Non-financial institution accounts may include, but are not limited to, a specific telephone number, an email address, a subscription, a grocery membership/rewards card, layaway account or the like. In some instances, the non-financial institution accounts may be financial accounts, such as a merchant credit card account or the like. In specific embodiments of the invention, the account data file includes account status, such as: open, new, closed, suspended, in default, balance, limit and the like. As previously noted, part or all of the account data 330 may be included in the behavior/transaction data 310, the product data 320, or the risk database may be configured to implement a separate file for the account data 330.

In addition, the non-financial institution data 300 may also include channel data 340 that indicates the source of the customer behavior/transaction. Non-financial institution channels may include, but are not limited to, the non-financial institution retail outlet, online/mobile or via a call center. As previously noted, part or all of the channel data 340 may be included in the behavior/transaction data 310 or the risk database may be configured to implement a separate file for the channel data 340.

Moreover, the non-financial institution data 300 may include asset and liability data 350. The asset data may include, but is not limited to, deposit balances, credit balances on accounts, devices owned (e.g., cellular telephone(s)) and the like. The liability data may include credit outstanding, credit limits, payment status data, layaway balances, claims and the like.

In addition, the non-financial institution data 300 may include customer data 360 that indicates customer name, personal data, demographics data and any other customer data associated with accounts or products. Customer data 360 may additionally include scores derived from the data in the risk database 100, such as baseline and risk scores and the like. It may also include any risk indicators from data collected in the account data 230, 330 or negative file data 270, 370 regarding a customer or their associated information (e.g., late payment data, bad addresses or the like).

Further, according to specific embodiments, the non-financial institution data 300 may include negative file data 370 which includes identifying data related to historical/known fraud, default or other high risk activities. In specific embodiments, the non-financial institution negative file data 370 may be multi-industry negative file data or the like. Thus, the negative file data 370 may be received from multiple non-financial institutions 40 or from third-party data aggregators 30. It should be noted that in specific embodiments, negative file data 370 may be received from entities that are not otherwise contributors to the risk database 100. Additionally, negative file data 370 includes, but is not limited to, fraudulent activity related to multiple products and/or services and multiple communication channels for delivering the products/services. The negative file data 370 may include, but is not limited to, the name(s) of the high risk individuals and entities (e.g., fraud perpetrators, criminals, rings, suspected terrorist, money launderers, criminal watch lists, defaulters, entities filing liquidation-proceedings, entities with debt status below investment grade and the like), addresses, telephone numbers, social security numbers, IP addresses, device identifiers/prints, such as Subscriber Identity Module (SIM) number or the like, biometric data, such as fingerprint data, voice data or the like associated with the fraud perpetrators and the like. The negative file data 370 may also indicate if these data elements belong or are associated with a perpetrator(s) or have been illegitimately used by the perpetrator. Additionally, negative file data 370 may include suspicious account data, otherwise referred to as compromised-account data, which includes data related to computer security violators (i.e., hackers), counterfeited accounts or the like. Additionally, according to some embodiments, the suspicious-account data includes data related to fraudulent telephone calls and/or a counter-fraud the like, which targets financial institution customers. According to some embodiments, this may include derogatory files from government agencies, including liens, tax defaults, insurance/Medicare fraud, criminal histories and the like. In addition, the negative file data 370 may, in some embodiments, include information regarding defaults, liquidations and the like.

The non-financial institution data 300 may additionally include counterparty data 380. A "counterparty" is defined herein as the parties that are involved in the transaction with non-financial institution customer(s), such as a seller, buyer, caller, network transmitting the call, emailer, social network friend and the like. Counterparty data 380 may include, but is not limited to, data related to customer transactions or interactions that are specific to the counterparty. Additionally, counterparty data includes identifying characteristics of the counterparties such as, but not limited to, name, location, merchant number, parent company and the like. In some embodiments of the invention, the counterparty data 380 is augmented with data regarding the counterparty that can be obtained from the customer data 260, 360 as well as claims data 290, 390. Additionally, counterparty data 380 may include overall statistics associated with the counterparty that are relevant to risk determination.

The non-financial institution data 300 may also include claims data 390 that includes fraud and non-fraud claims made by the customer or the counterparty. The claims data 390 is across multiple non-financial institution products, multiple non-financial institution channels and multiple different non-financial institution entities.

In some embodiments of risk database 100, financial institution data 200 and non-financial institution data 300 are combined in one database. In these embodiments, data may be organized by customer, transaction, accounts, products or the like, regardless of whether it was sourced from a financial institution or a non-financial institution. In other embodiments, data may not be sourced at product or channel levels, but a product or channel may be derived from at least one of the behavior/transaction data 210, 310, account data 230, 330, asset and liability data 250, 350 and/or customer data 260, 360. In other embodiments, the data is stored by supplier and then combined as needed for analytic purposes.

Figure 2:
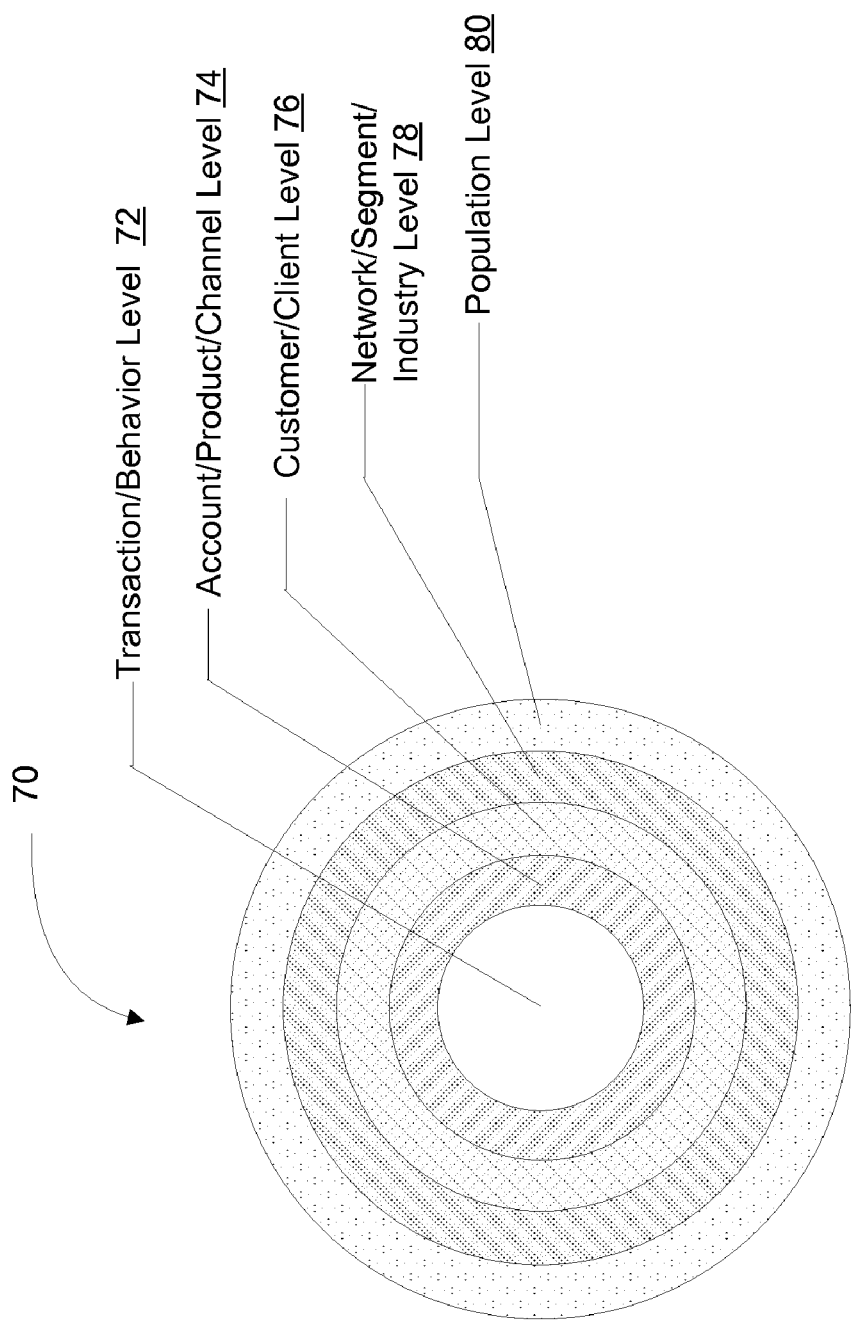
FIG. 2 is a concentric circle diagram that illustrates the risk database's ability to receive data on various different levels, aggregate the data at various levels and to assess risk at the various different levels, in accordance with embodiments of the present invention.

Referring to FIG. 2, a schematic diagram 70 is shown in which concentric circles represent the various levels of information received from financial and non-financial institutions and processed by the centralized risk database, in accordance with embodiments of the present invention. At the first level, represented by the innermost circle, the centralized risk database receives transaction/behavior level data 72. For financial institutions, transaction data may include, but are not limited to, payments/purchases with external entities, such as retailers/merchants or the like; deposits; withdrawals; transfers; advances; payments; and the like, made internally within the financial institution. Transaction data identifies the entities which the customer is transacting with. Aggregating transaction/behavior level data 72 results in account/product/channel level data 74. Aggregation of accounts can also result in product data.

At the second level, represented by the second innermost circle, the centralized risk database receives account/product/channel level data 74. For financial institutions, accounts may include, but are not limited to, checking accounts, savings accounts, loan accounts, investment accounts and the like. Products may include, but are not limited to, checking products, credit card products, debit card products, loan products, online services, telephone services and the like. Channels may include, but are not limited to, retail locations, ATMs, kiosks, call centers, online/websites, including mobile applications and the like. Aggregating transaction/behavior level data 72 across accounts, products, or channels (i.e., account/product/channel level data 74) results in customer/client level data 76.

At the third level, represented by the third innermost circle, the centralized risk database receives customer/client level data 76. As previously noted, a customer includes consumer customers, individuals or joint parties, and business or corporate customers. Aggregating customer/client level data 76 across a given characteristic results in network/segment/industry level data 78.

At the fourth level, represented by the second outermost circle, the centralized risk database receives network/segment/industry level data 78. The network data may be reflected by one or more inter-dependencies or interactions, such as friendship, kinship, financial exchange or other relationships/memberships based upon common interest, common dislike, common beliefs, knowledge or prestige to which a plurality of customers or clients belong. Segment data may be reflected by one or more common characteristics shared by customers or clients. Industry data may be reflected by all of the data within an industry associated with a group of clients. Aggregating customer/client level data 76 across similar characteristics, such as behaviors, geographic locations, interactions, industries or the like results in network/segment/industry level data 78.

At the fifth level, represented by the outermost circle, the centralized database receives population level data 80. The population data reflects the overall population of customers or clients. Aggregating network/segment/industry level data 78 results in population level data 80.

Figure 3:
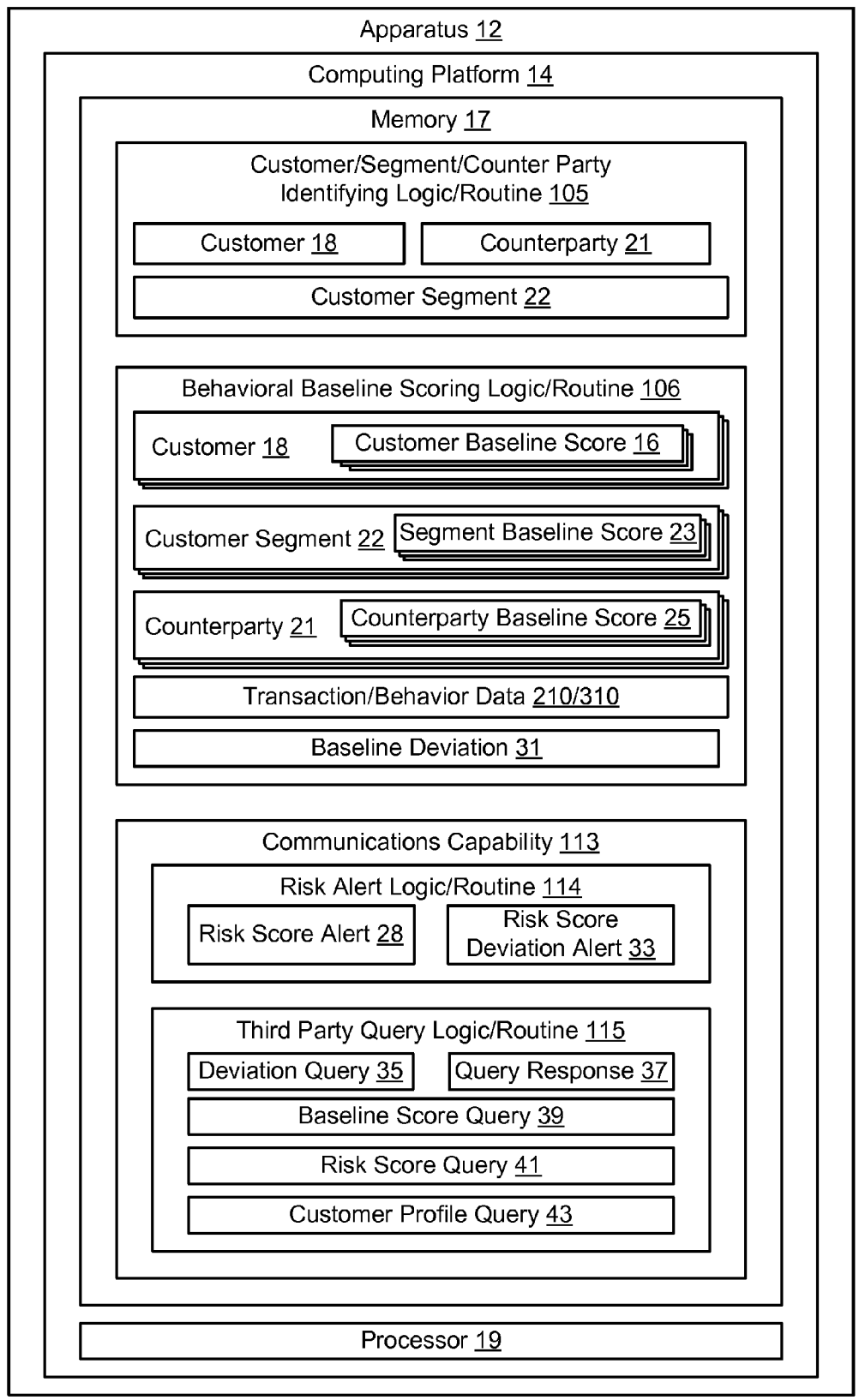
FIG. 3 is a block diagram of an apparatus configured to provide behavioral baseline scoring, determination of deviations from baseline and alert notification in the event of deviations, in accordance with embodiments of the present invention.

FIG. 3 depicts an apparatus 12 configured to provide customer-specific behavioral baseline scoring, in accordance with embodiments of the present invention. Baseline determination takes into account various individual behaviors in determining what is "normal" or a baseline for the individual in terms of risk. In the financial area, baselines can be developed around payment behaviors, average deposit behaviors, channel behaviors and the like. In non-financial areas, baselines can include calling patterns, purchase behaviors, web surfing behaviors, travel patterns and the like. Changes in behaviors can represent a potential for risk. Institutions that identify or are alerted to a deviation from the normal behavior may choose to deny a transaction or flag it for further evaluation or investigation. Such behavioral baseline scoring takes into account individual-by-individual variances in risk. For some behavioral baseline scores, if the score exceeds a predetermined baseline threshold and/or deviations from the baseline occur the customer may be deemed an increased risk.

The apparatus 12 includes a computing platform 14 having a memory 17 and at least one processor 19 that is communication with the memory 17. The memory 17 stores customer/segment/counterparty identifying logic/routine 105 that is configured to uniquely identify a customer 18, or customers within a customer segment 22, or a counterparty 21 (i.e., parties with whom a customer transacts or interacts with) from within the data received by the centralized risk database 100 for the purpose of subsequently determining behavioral baseline scoring 16, 23 and 25 and risk scoring 26, 27 and 29 (shown in FIG. 4) for the customer, the customer segment, or the counterparty. Counterparty behavioral baseline scoring provides an indication of how the counterparty behaves in certain transactions. An example of a counterparty behavioral baseline score that would be monitored for risk purposes is merchant fraud claim rates. If a merchant's fraud rates increase, it may indicate that the merchant has been compromised.

The memory 17 additionally stores behavioral baseline scoring logic/routine 106, which is configured to determine customer behavioral baseline scores 16 for a plurality of customers 18; and/or segment behavioral baseline scores 23 for a population/customer segment 22, which indicates how the segment of customers normally behaves from a behavioral perspective; and/or counterparty behavioral baseline scores 25 for a counterparty 21, which indicates how the counterparty normally behaves from a behavioral perspective. The customer behavioral baseline score 16, the segment behavioral baseline score 23 and the counterparty behavioral baseline score 25 define the normal behavior for the customer or the segment of customers or counterparty.

In specific embodiments, the customer behavior baseline score 16, the segment behavioral baseline score 23 and the counterparty behavioral baseline score 25 are based on financial institution data 200 and/or non-financial institution data 300 stored in the centralized risk database 100 (shown in FIG. 1) such as, but not limited to, individual check transactions, debit transactions, ACH transactions, bill pay transactions, or credit card transactions. In addition, negative file data 270, 370 and/or asset and liability data 250, 350 (shown in FIG. 1) may be utilized to determine the baseline risk scores 16, 23 and 25. Additionally, the customer behavioral baseline score 16, the segment behavioral baseline score 23 and the counterparty behavioral baseline score 25 may be based on non-financial institution data 300, such as retailer data, utility data or the like.

As such, behavioral baseline scoring logic/routine 106 accesses data, such as financial institution data 200 and/or non-financial institution data 300 or the like to determine the customer behavioral baseline score 16, the segment behavioral baseline score 23 and the counterparty behavioral baseline score 25. For example, the behavioral baseline-scoring logic/routine 106, when calculating a customer behavioral baseline score 16, a segment behavioral baseline score 23, and/or a counterparty behavioral baseline score 25 considers, for each customer, how often and when the customer: uses an ATM; calls a call center; visits a branch location; accesses online banking; writes a check; uses a debit card; uses a credit card; makes a deposit; etc. In addition to frequency information, the behavioral baseline scoring logic/routine 106 may consider the amounts of transactions; location of behaviors; channels and products used; asset and liability balances maintained and the like. The behavioral baseline scoring logic/routine 106 then calculates a behavioral baseline score that represents those considerations and defines what is "normal" or baseline for that particular customer 18, customer segment 22 or counterparty 21.

It should also be noted that multiple behavioral baseline scores 16 can be determined for a customer 18, multiple segment behavioral baseline scores 23 can be determined for the associated customer segment 22 and/or multiple counterparty behavioral baseline scores 25 can be determined for the associated counterparty 21. This is because behavioral baseline scores are behavioral-based; meaning that baseline scores are associated with one or more behaviors, characteristics, traits or the like associated with the customer, segment or counterparty. As such, multiple customer behavioral baseline scores 16 and/or multiple segment behavioral baseline scores 23 and/or multiple counterparty behavioral baseline scores 25 aid in better understanding the behavior of the customer or segment. For example, a behavioral baseline score may be associated with the locations where the customer or segment interacts/transacts and/or persons/entities that the customer or segment transacts with. A further example includes customer behavioral baseline scores and/or segment scores and/or counterparty scores associated with customer deposits and/or withdrawals. Such deposit-associated and/or withdrawal-associated scores provide insight into changes in income; whether the customer is liquidating assets, overdrawing across multiple financial institutions and the like. Further, a comprehensive or overall behavioral baseline score may be determined for a customer 18, a customer segment 22, or a counterparty 21 that takes into account all of the customer's/customer segment's/counterparty's behaviors, characteristics, traits and the like.

Additionally, behavioral baseline scoring logic/routine 106 is configured to determine baseline deviations 31 from the customer behavioral baseline scores 16 and/or segment behavioral baseline scores 23 and/or counterparty behavioral baseline scores 25. According to specific embodiments, baseline deviations 31 may be configured to be based on a single event/transaction, or a series or combination of events/transactions. For example, a withdrawal in excess of a baseline withdrawal amount for the particular individual/customer may define a baseline deviation 31, or a certain number of withdrawals, in excess to the individual/customer's baseline number of withdrawals, over a designated period, may constitute a baseline deviation 31. In addition, in certain embodiments, in order to ensure that timely corrective actions occur, the events/transactions associated with a behavioral baseline deviation may be determined and reported to the behavioral baseline scoring logic/routine 106 in real-time or near-real-time to the occurrence of the deviation; and/or in periodic batch file processing. It should also be noted that deviations may include negative deviations, i.e., deviations that increase risk and negatively impact the behavioral baseline scores 16, 23 and 25 and positive deviations, i.e., deviations that decrease risk and positively impact the behavioral baseline scores 16, 23 and 25.

Additionally, apparatus 12 includes a communication capability 113 that is configured to communicate risk scores (shown in FIG. 4) and behavioral baseline scores to financial institutions, non-financial institutions, customers and counterparties. In some embodiments, the customer or counterparty must indicate consent to have their risk scores or behavioral baseline scores shared with another entity. The communications capability 113 is configured to communicate these scores to financial institutions and non-financial institutions upon receiving requests and meeting other predefined requirements for obtaining receipt of this information. The communications capability 113 may further be configured to provide periodic updates of these scores to customers, counterparties, financial institutions and non-financial institutions. In specific embodiments of the invention, the updates may be sent in parallel, so that all entities receive updates at the same time, or the updates may be sent at different times.

Additionally, the communications capability 113 includes risk alert logic/routine 114 that is configured to automatically generate and initiate communication of risk score alerts 28 to predetermined entities upon determination of a predefined threshold, or changes in customer risk score 26 (shown in FIG. 4) or the like. Additionally, in other specific embodiments, risk alert logic/routine 114 is configured to generate and initiate communication of risk score deviation alerts 33 to predetermined entities upon determination of a predefined deviation threshold or occurrence of a predefined deviation event or combination of events. The risk score alerts 28 and/or risk score deviation alerts 33 may be configured to be communicated to the business, such as the financial institution, industry-wide, such as to all financial institutions, to the customer/client, to retailers, government agencies or the like. In certain embodiments of the invention, the risk score alerts 28 and risk score deviation alerts 33 may be communicated to businesses, financial institutions and non-financial institutions that have an active relationship with the customer and may, in some embodiments, require the business to subscribe to an alert service. Additionally, the risk alert logic/routine 114 may be configured to communicate the alert to a designated entity based on the type of deviation or the level of deviation, e.g., certain deviations will be configured to send alerts to the business, while other deviations, typically more severe deviations, will be configured to be sent to those who have a business relationship with the customer/segment/counterparty, specific businesses within an industry, industry-wide and/or to government agencies. In this regard, the risk score deviation alert 33 may notify an entity of a negative deviation and/or a positive deviation and the risk score alert 28 may notify the entity of an increase or decrease in the risk score 26, 27 or 29.

In addition, the communications capability 113 stores third-party query logic/routine 115 that is configured to provide for receipt of third-party deviation queries 35, which allow for a third-party, such as a financial institution or non-financial institution, e.g., a merchant or the like, to access system 10, and specifically access third-party query logic/routine 115 to determine if an event/behavior associated with a customer is a deviation from the norm (i.e., a deviation from the customer's baseline score or the like). Based on the determination, a query response 37 is communicated to the third-party, which serves to notify the third-party of the verification/non-verification of the deviation. In addition, the third-party query logic/routine 115 may be configured to receive baseline score queries 39 and/or risk score queries 41, from customers, counterparties, financial institutions, or non-financial institutions, which, in response, return a query response 37 that includes the requested baseline score 16, 23 or 25 or requested risk score 26, 27 or 29. In some embodiments of the invention, a third-party request for a baseline score or a risk score initiates periodic transmissions of those scores to the third-party (e.g., request a score at account opening and receive monthly updates). In other embodiments, the third-party query logic/routine 115 is configured to receive customer profile queries 43, which are configured to cause the processor 19 to query the customer data files 260 and 360 and the negative file data 270 and 370 to confirm a customer's personal information and other customer criteria is legitimate and up-to-date.

In additional embodiments, communications capability 113 may be configured to communicate notification of updates to negative file data 270 and/or 370 to predetermined entities upon determination of a negative file update. In still further additional embodiments, the communications capability 113 may be configured to communicate notification of suspicious activity to predetermined entities. Suspicious activity may include, but is not limited to, when a customer's personal data and/or financial data appear within negative file data 270 or 370 (e.g., their telephone number); when there is a deviation in the customer's risk score 26; accounts are opened or closed in the customer's name at financial or non-financial institutions as recorded in account data 230 and 330; biometric data provided does not match biometrics on file for the customer 18; and the like.

In some embodiments of the invention, the customer or counterparty may be required to indicate consent to have their risk scores or behavioral baseline scores shared with a third-party. Additionally, in other embodiments of the invention, the third-party may be required to demonstrate that they meet the requirements for obtaining these scores based upon legal and regulatory requirements. In other embodiments of the invention, the third-party may be required to demonstrate that they have met the predefined requirements established by the company (or companies) managing the risk database 100, the behavioral baseline scores 16, 23 or 25, behavioral baseline deviation 31, the risk scores 26, 27 or 29, the risk alert logic/routine 114 and or the third-party query logic/routine 115.

The risk alert logic/routine 114 and the third-party query logic/routine 115 may be configured to communicate the alerts 28 or 33 or the query response 37 via a chosen communication channel, such as letter, email, Short Message Service (SMS)/text, voicemail or the like. Since most queries and alerts will be communicated to businesses, financial institutions and non-financial institutions, in many instances the queries and/or alerts will be configured to be communicated electronically either in real-time, near-real-time or periodic batch files to the business' system, database or the like. These business-to-business communications can include one or multiple queries and/or alerts pertaining to one or multiple customers, segments or counterparties.

Figure 4:
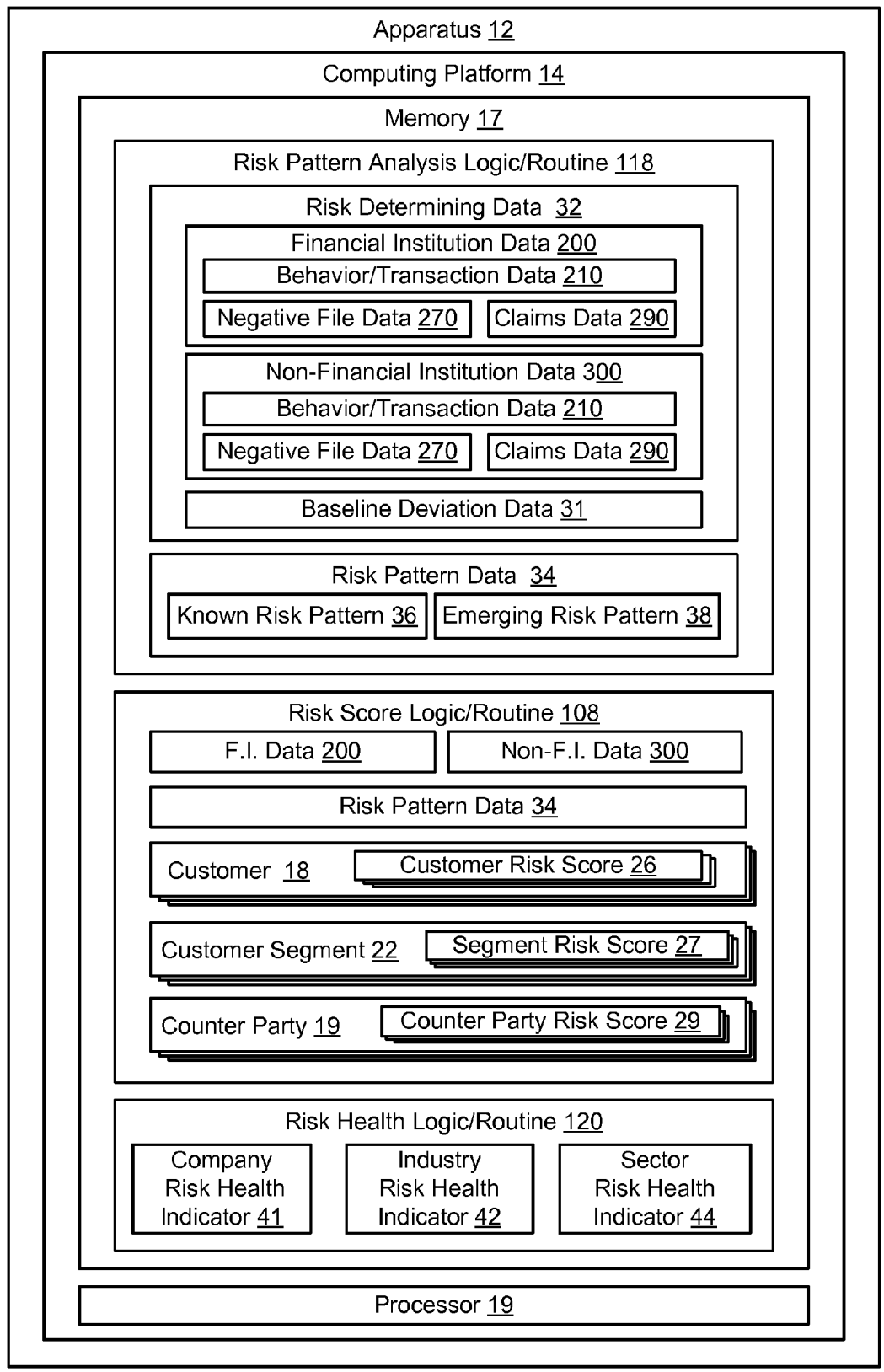
FIG. 4 is a block diagram of an apparatus configured to provide risk pattern determination and, specifically, new pattern types based on data in the risk database, deviations from baseline, claim data and negative activity data, in accordance with embodiments of the present invention.

FIG. 4 illustrates an apparatus 12 configured for risk scoring and risk pattern analysis, in accordance with an embodiment of the present invention. The apparatus includes a computing platform 14 having a memory 17 and at least one processor 19 in communication with the memory 17. The memory 17 of apparatus 12 includes risk pattern analysis logic/routine 118 that is configured to analytically identify and monitor and risk pattern data 34 including known risk patterns 36, such as known frauds or the like and new emerging risk patterns 38, such as new emerging types of risk or the like. A risk pattern identifies one or more data elements that is statistically linked to loss due to a specific risk type (e.g., fraud, credit, money laundering, etc.). Risk patterns are identified and monitored based on any combination of financial institution data 200 and/or non-financial institution data 300. In specific embodiments of the invention, transaction/behavior data 210, and/or 310; claims data 290 and/or 390 and/or negative file data 270 and/or 370 may be integral in identifying known and/or emerging risk patterns, although any data in risk database 100, alone or in combination may be used to identify known and/or emerging risk patterns. Additionally, according to specific embodiments, risk pattern analysis logic/routine 118 relies on behavioral baseline deviation data 31, typically in conjunction with other data, such as negative file data 270 and/or 370 (shown in FIG. 3) or the like to identify and monitor risk patterns and, in specific embodiments, identify areas of high levels of loss due to specific risk type.

In certain embodiments of the invention, when new/emerging risk patterns 38 are identified, the probability to manage these new risks are also identified and shared with various businesses who are customers of the risk pattern data 34 or the risk database 100. Additionally, in some embodiments, the emerging risk pattern 38 may provide one or all of the following: probability of incurring a gross or net loss associated with new/emerging risk; means to identify the risk pattern and/or recommendations regarding how to prevent transactions or combinations of behaviors/transactions associated with the risk (vs. flagging them for further evaluation). The communication of these new or emerging risk patterns 38 to the appropriate financial and non-financial institutions may be managed via communications capability 113 (shown in FIG. 3). In some embodiments, new/emerging risk patterns 38 are also communicated to the risk score logic/routine 108, initiating an update of customer, segment/population, and counterparty risk scores 26, 27, and 29. In addition, once a new/emerging risk pattern 38 is identified, the corresponding known risk file is updated to reflect the new/emerging risk pattern 38.

Additionally, the memory 17 of apparatus 12 stores risk score logic/routine 108 that is configured to determine a customer risk score 26 for customers 18, a segment risk score 27 for customer segment 22 and/or a counterparty risk score 29 for counterparties 19. The customer risk score and/or segment risk score and/or counterparty score provides an indication of the likelihood that the customer, the segment of customers or the counterparty represents a risk that is likely to result in a financial loss, such as likelihood to default, perpetrate a fraud in the future or the likelihood that the counterparty, customer or segment is susceptible to fraud or default in the future. According to specific embodiments, the customer risk score 26 or segment risk score 27 or counterparty risk score 29 may be based off of risk patterns determined from financial institution data 200, such as, but not limited to, behavior/transaction data 210 (shown in FIG. 1), asset and liability data 250 (shown in FIG. 1), negative file data 270 (shown in FIG. 1) and the like. As previously discussed, the risk pattern analysis logic/routine 118 may be implemented to identify incidences of known risk patterns 36 in a customer's, segment's or counterparty's profile that correlate to loss. In some embodiments, the risk score logic/routine 108 weighs the incidences of risk patterns based upon the frequency, mix and probability of loss associated with the individual risk patterns and the combination of risk patterns in a customer's, segment's or counterparty's profile. In alternate embodiments, the customer risk score 26 or segment risk score 27 or counterparty risk score 29 may be additionally based on risk patterns based off of non-financial institution data 300, such as, but not limited to, behavior/transaction data 310 (shown in FIG. 1), asset and liability data 350 (shown in FIG. 1), negative file data 370 (shown in FIG. 1) and the like. In specific embodiments of the invention, negative file data 270 and/or 370 are implemented in risk scoring to incorporate history of risk and any negatives associated with customer data 260 and/or 360 (shown in FIG. 1) (e.g., incorrect telephone number, high risk zip code or the like).

The customer and counterparty risk scores 26, 29, when compared to segment risk scores 27, can tell a company whether a customer represents an average, above average or below average risk of loss. In some embodiments, the score may include patterns related to the ability to detect a risky transaction, or combination of transactions, or traits in process, which if detected could prevent or mitigate the risk event. In some embodiments, the segment risk score 27 provides for identifying locations, zip codes, merchants and the like that have above average risk (e.g., default, fraud, etc.) rates.

Optionally, memory 17 of apparatus 12 may store risk health logic/routine 120 that is configured to determine a company risk health indicator 41, industry-wide risk health indicator 42 and/or sector risk health indicator 44 for a sector of an industry, examples of sectors include specific businesses within the industry (e.g., luxury auto sector of the auto industry). The risk health indicator, which may be configured as a score or the like, provides an indication of how well the industry, sector of the industry or company is managing risk, such as fraud, credit, money laundering or the like or, conversely, how poorly the industry, sector of the industry or company is doing in not managing risk. Additionally, according to specific embodiments, the risk health indicator 41, 42 and/or 44 provides for identifying points of compromise, such as ATMs, retailers, processors or the like, which have above average fraud rates indicative of having been compromised/hacked. In additional embodiments, the risk health indicator 41, 42 and/or 44 provides for identifying locations, zip codes, merchant locations and the like that have above average risk (e.g., default, fraud, etc.) rates.

Figure 5:
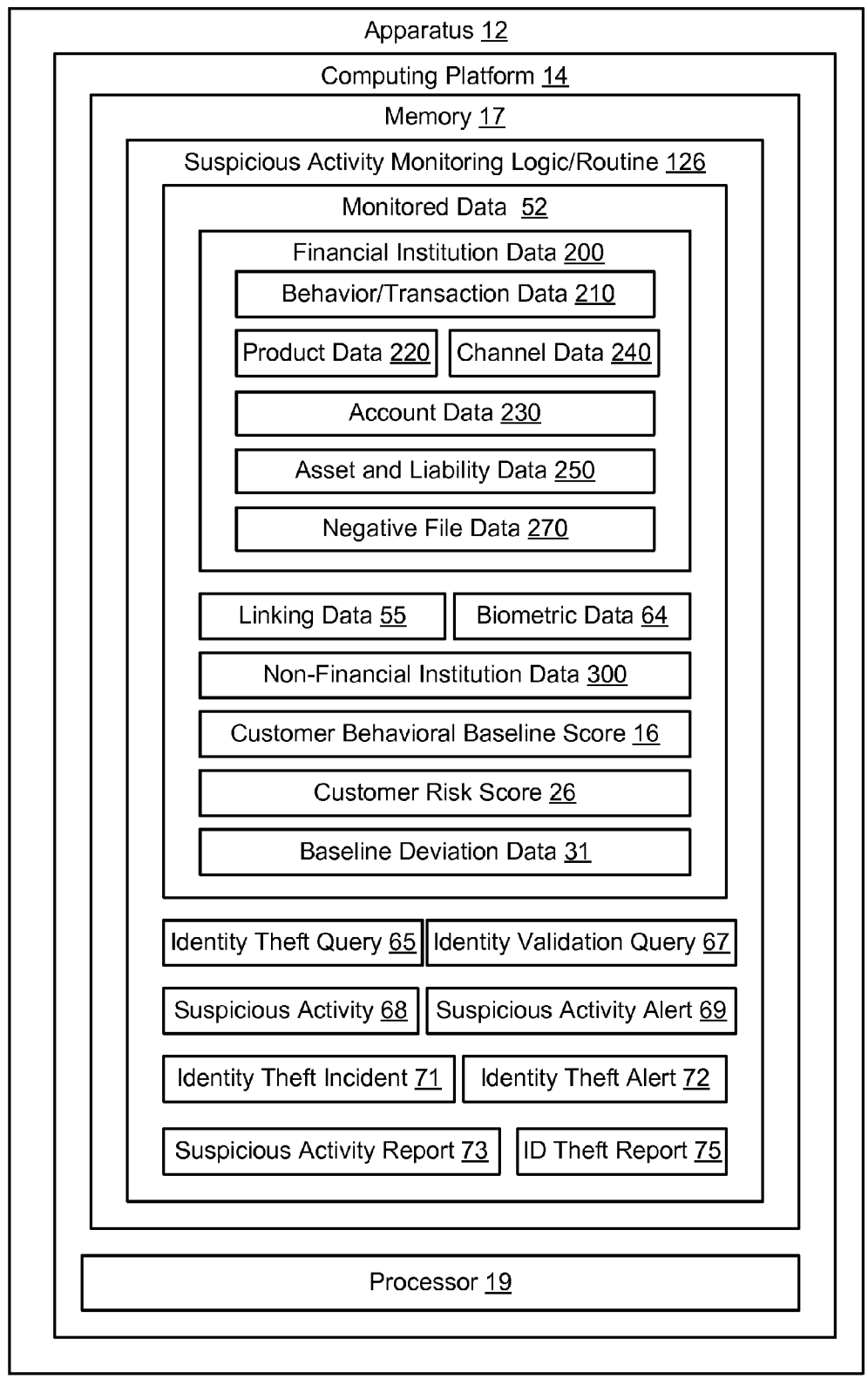
FIG. 5 is a block diagram of an apparatus configured to provide suspicious activity monitoring based on asset and liability activity and financial institution transaction activity, including deposits and security investments and behavioral/transaction data, in accordance with embodiments of the present invention.

Turning the reader's attention to FIG. 5, depicted is an apparatus 12 configured for suspicious activity monitoring, in accordance with further embodiments of the invention. The apparatus 12 includes a computing platform 14 having a memory 17 and at least one processor 19. The memory stores suspicious activity monitoring logic/routine 126 that is configured to provide comprehensive suspicious activity monitoring across multiple financial institution products, multiple financial institution channels and multiple financial institutions. As such, the monitoring is not limited to credit products/data but, since the logic/routine 126 has access to all of the data provided in the centralized risk database 100, including deposit data and investment/security data, including account data and product data which does not necessarily require credit checks. As such, the monitored data 52 is not limited to conventionally monitored credit data, but also any financial institution data 200 including, but not limited to, multiple financial institutions' behavior/transaction data 210, product data 220 and channel data 240. In addition, monitored data 52 may include account data 230, such as account opening and closing data and the like, that is used to identify suspicious activity potentially associated with an identity theft incident. Additionally, the monitored data 52 may include asset and liability data 250, including asset data, such as deposit balances, overdrafts, investments and liability data, such as credit outstanding, credit limits, payment status and the like.

The monitored data 52 may also include linking data 55 that links behaviors/transactions to a customer, such as personal identifiers, e.g., name, address, social security number or the like. Additionally, according to specific embodiments, the monitored data 52 may also include emerging data, such as biometric data 64, including voice, fingerprint and the like. In some embodiments, the personal linking data 55 and biometrics data 64 are found within the risk database 100 in the customer data 260 and/or 360. The suspicious activity monitoring logic/routine 126 monitors customers' customer data 260, 360; account data 230, 330 and behavior/transaction data 210, 310, for suspicious activity 68. Suspicious activities 68 include, but are not limited to, when a customer's personal data and/or financial data appear within negative file 270 or 370 (e.g., their telephone number); when there is a deviation in the customer's risk score 26; accounts are opened or closed in the customer's name at financial or non-financial institutions as recorded in account data 230 and 330; biometric data provided does not match biometrics on file for the customer 18; and the like.

The suspicious activity monitoring logic/routine 126 may further be configured to receive identity theft queries 65 from financial institution, non-financial institution entities and/or customers, and determine whether a queried transaction, behavior, person or entity represents a likely identity theft incident. The suspicious activity monitoring logic/routine 126 may rely on any of the monitored data 52 to determine if the queried transaction, behavior, person or entity represents a likely identity theft incident. Based on the results of the query, a response may be communicated to the querying party and/or other parties as dictated by the nature of the query, the likelihood of the identity theft incident or the like. Further, the suspicious activity monitoring logic/routine 126 may further be configured to receive identity validation queries 67 from financial institution, non-financial institution entities and/or customers, and validate the identity of a person or entity identified in the query. The suspicious activity monitoring logic/routine 126 may rely on any of the monitored data 52 to validate the identity of the queried person or entity. Based on the results of the validation, a response may be communicated to the querying party and/or other parties that serve to validate or repudiate the identity of the person or entity.

Based on the occurrence of a suspicious activity 68, the logic/routine 126 may, according to specific embodiments, generate and communicate a suspicious activity alert 69 to one or more designated entities, such as financial institutions, the customer, non-financial institutions or the like. Additionally, according to further specific embodiments, the suspicious activity monitoring logic/routine 126 may be configured to generate and communicate suspicious activity reports 73, which may be communicated to designated entities, such as financial institutions, non-financial institutions, customers or the like. Customer review of such reports provides for verification of the compromising event or data element.

In certain embodiments of the invention, the suspicious activity reports 73 also fulfill the need to supply customers/clients with the data that is used to detect a suspicious activity, and create their behavioral baseline scores and/or their risk scores. Additionally, in some embodiments, upon receipt of such reports, should a customer identify an error in the data reported, they can work with either the supplier of the data to correct it, or with the entity managing the risk database 100.

Based on the confirmation of an identity theft incident 71 associated with identified suspicious activity 68, the logic/routine 126 may, according to specific embodiments, generate and communicate an identity theft alert 72 to one or more designated entities, such as financial institutions, the customer, non-financial institutions or the like. Additionally, according to further specific embodiments, the suspicious activity monitoring logic/routine 126 may be configured to generate and communicate ID theft reports 75, which may be financial institutions, non-financial institutions, customers or the like.

Figure 6:
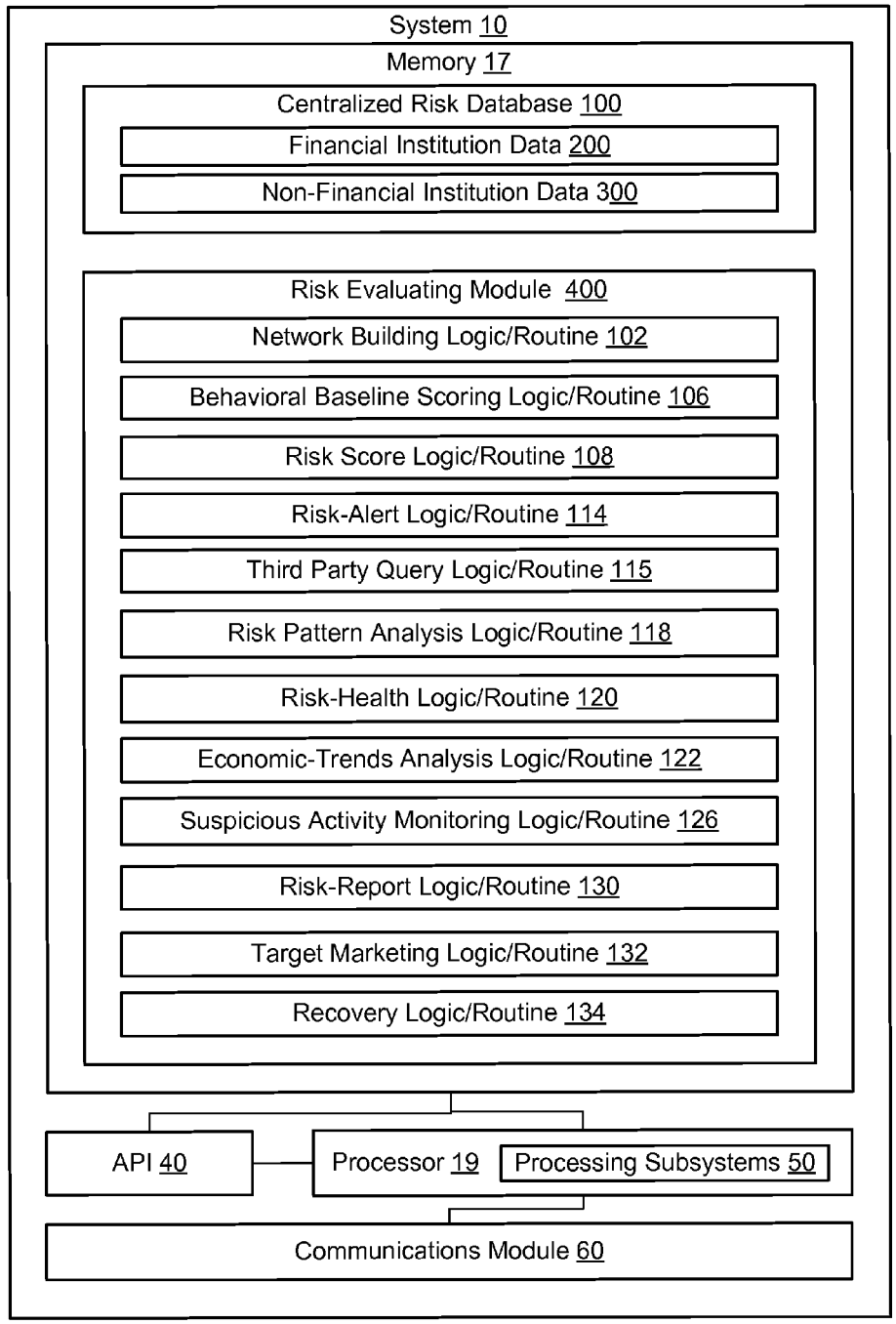
FIG. 6 is a more detailed block diagram of the system of FIG. 1, in accordance with an embodiment of the present invention.

FIG. 6 provides a more detailed block diagram of the system 10, which, according to some embodiments, collects transaction data across financial products and channels from multiple financial institutions, data aggregators, and non-financial institutions for the purpose of reducing risk, for example, risk associated with credit and/or fraud; identifying terrorist financing, tracing money trails associated with illegitimate uses and the like. The system 10 may include one or more of any type of computerized device. The present system and methods can accordingly be performed on any form of one or more computing devices.

The system 10 includes memory 17, which may comprise volatile and non-volatile memory, such as read-only and/or random-access memory (RAM and ROM), EPROM, EEPROM, flash cards, or any memory common to computer platforms. Further, memory 17 may include one or more flash memory cells, or may be any secondary or tertiary storage device, such as magnetic media, optical media, tape, or soft or hard disk.

Further, system 10 also includes processor 19, which may be an application-specific integrated circuit ("ASIC"), or other chipset, processor, logic circuit, or other data processing device. Processor 19 or other processor such as ASIC may execute an application programming interface ("API") 40 that interfaces with any resident programs, such as the risk evaluating module 400 and related applications/routines and/or logic or the like stored in the memory 17 of the system 10.

Processor 19 includes various processing subsystems 50 embodied in hardware, firmware, software, and combinations thereof, that enable the functionality of system 10 and the operability of the system on a network. For example, processing subsystems 50 allow for initiating and maintaining communications and exchanging data with other networked devices. For the disclosed aspects, processing subsystems 50 of processor 19 may include any subsystem used in conjunction with the risk evaluating module 400 or the like or sub-components or sub-modules thereof System 10 additionally includes communications module 60 embodied in hardware, firmware, software, and combinations thereof, that enables communications among the various components of the system 10, as well as between the other devices in the network. Thus, communications module 60 may include the requisite hardware, firmware, software and/or combinations thereof for establishing a network communication connection. It should be appreciated that the communications module 60 is the mechanism through which subscribers to various services provided by embodiments of the present invention can submit queries to the system 10. It should also be appreciated that the communications module 60 is the mechanism through which embodiments of the present invention sends alerts/reports/scores/data to configured recipients and the like.

The memory 17 includes risk evaluating module 400 that is executable by processor 19. The risk evaluating module 400 receives data 200 and 300. As previously discussed, the financial institution data 200 may include, but is not limited to, behavior/transaction data 210, product data 220, account data 230, channel data 240, asset & liability data 250, customer data 260, negative file data 270, counterparty data 280 and claims data 290. Further, the non-financial institution data 300 may include, but is not limited to, behavior/transaction data 310, product data 320, account data 330, channel data 340, asset & liability data 350, customer data 360, negative file data 370, counterparty data 380 and claims data 390.

The risk evaluating module 400 includes a plurality of logic/routines configured to assess, manage and mitigate risk based on use of the data collected in the centralized risk database 100. The logic/routines shown in FIG. 6 are by way of example only and, as such, risk evaluating module 400 may include more or less logic/routines as dictated by the implementation of system 10. In specific embodiments, risk evaluating module 400 includes network building logic/routine 102. The network building logic/routine 102 is configured to gather data 200 and 300 from the centralized risk database 100 and format and correlate the data for the purpose of communication to and from integrated risk and customer data network 500 (shown in FIG. 1). The network 500 provides for communication of the comprehensive data set. Analytics providers can access the network 500 to obtain a single source of high quality data, thereby reducing costs associated with providing analytics. Further, financial institutions can access the network 500 to obtain industry-wide information about specific customers' history of risk/fraud and thereby, reduce costs associated with transacting with high-risk customers, as well as access to other aggregated information for the purpose of managing risk (e.g., drawing down 100% of their lines of credit across different financial institutions may inform a different bank's decision to pay an overdraft, or an investment company's decision to lend on margin). In other embodiments of the invention, financial institutions or non-financial institutions can receive notification from the system 10 of a change, negative or positive, in risk status.

The risk evaluating module 400 further includes previously described behavioral baseline scoring logic/routine 106. The behavioral baseline scoring logic/routine 106 generates one, and in many instances multiple, behavioral baseline score(s) for individual customers, or segments of customers or counterparties. The behavioral baseline score defines the normal transaction behavior for a customer or a segment of customers and may be customer-behavior or customer-characteristic specific. According to specific embodiments, the behavioral baseline scoring logic/routine 106 is configured to access financial institution data 200, and, in some embodiments, the non-financial institution data 300 to determine the behavioral baseline score. In specific embodiments, the behavioral baseline scoring logic/routine 106 is configured to calculate/determine a behavioral baseline score based on a plurality of transaction customer-specific parameters, including but not limited to, how often and when the customer: uses an ATM; calls a call center; visits a branch location; accesses online banking; writes a check; uses a debit card; uses a credit card; makes a deposit; the amounts of the related transactions; cross-channel purchasing behaviors, etc. The behavioral baseline scoring logic/routine 106 then calculates a behavioral baseline score that represents those considerations and defines what normal and abnormal behaviors are for a customer.

The behavioral baseline scoring logic/routine 106 is further configured to determine positive or negative deviations from the baseline score and provide alerts based on the deviations. According to specific embodiments, risk deviations may be configured to be based on a single event/transaction, or a series of events/transactions. Thus, a deviation may be defined as a predetermined degree of deviation from the behavioral baseline score or the like. It should also be noted that deviations from the baseline may include negative deviations, (i.e., deviations that increase risk) and positive deviations (i.e., deviations that decrease risk).

Further, risk evaluating module 400, according to specific embodiments, includes risk score logic/routine 108 that is configured to determine one or more risk scores for customers, segments or populations of customers and/or counterparties. The risk score and/or segment risk score and/or counterparty risk score provides an indication of the likelihood that the customer, the segment of customers or the counterparty represents a risk that is likely to result in a financial loss, such as likelihood to default, perpetrate a fraud in the future, be involved in a financial crime like terrorist financing or money laundering and the like. In some embodiments, it may also indicate the likelihood that the counterparty, customer or segment is susceptible to become a victim of fraud, default or other risk in the future. A customer or counterparty may have multiple risk scores (e.g., a risk score for fraud; a risk score for credit loss; a risk score for money laundering, an overall risk score and the like). The risk score is based upon risk pattern data 34 which identifies risky behaviors/transactions, patterns and combinations thereof.

According to specific embodiments, the risk scores may be based on risk patterns based off of financial institution data 200. In alternate embodiments, the risk scores may be additionally based on risk patterns based off of non-financial institution data 300. In further embodiments of the invention, the risk scores may be based on financial institution negative file data 270, and optionally non-financial institution negative file data 370 to incorporate history of risk and any negatives associated with customer data (e.g., incorrect telephone number, high risk zip code or the like).

The risk score logic/routine 108 may be further configured to assign customers or groups of customers to segments based on their risk score. For example, according to specific embodiments, the risk scores may be based on a scale of one to ten, where one is the lowest risk and ten is the highest risk. The risk score logic/routine 108 may be configured to assign customers having a risk score between one and three into a low risk segment/group. This low risk group's behaviors are not considered high risk, nor are they associated with any high risk companies or individuals. There is a low chance that customers in the low risk segment will behave in such a manner such that those doing business with them will lose money due to fraud, default or other type of risk. In some embodiments of the invention, these customers are assigned a low risk score because their financial behavior is highly predictable, rarely deviating from their behavioral baseline score as calculated by the behavioral baseline scoring logic/routine 106.

The risk score logic/routine 108 may be further configured to assign customers having a risk score between eight and ten to a high risk group, indicating those who do business with these people or entities have an above average risk of losing money in these business transactions. The high risk group may include customers who engage in multiple high risk activities (e.g., pay bills late, associate with known fraudsters, and make large number of cash advances against credit cards to cover overspent costs etc.). The high risk group may also include customers that have committed fraud or defaulted in the past. The high risk group may also include customers who have highly variable behaviors which make one or more behavioral baseline scores unreliable and not predictive.

The risk evaluating module 400, according to some embodiments, also includes previously described risk alert logic/routine 114. The risk alert logic/routine 114 generates and communicates risk score alerts and/or risk deviation alerts to the appropriate financial institution entities, non-financial institution entities or customers based on a predetermined increase or decrease in risk score, a predetermined level of deviation (positive or negative) and/or a specific deviation event or combination of deviation events.

Additionally, the risk evaluating module 400, according to some embodiments, also includes previously described third party query logic/routine 115. The third party query logic/routine 115 is configured to receive deviation queries, risk score queries or behavioral baseline score queries from third parties and determine whether behaviors or events exhibited by customers at the third party are deviations from the norm (i.e., deviations from the behavioral baseline score) or determine the current risk score or behavioral baseline score and, based on the determination, communicate query responses back to the third party. In other embodiments, the third party query logic/routine 115 is configured to look at the customer data 260 and 360 and the negative file data 270 and 370 to confirm the customer's personal information and is legitimate. In some embodiments, the third party query logic/routine 115 also sets up and executes ongoing refreshes of risk scores and behavioral baseline scores on a periodic basis to third parties.

According to some embodiments, the risk-evaluating module 400 also includes previously described risk pattern analysis logic/routine 118. The risk pattern analysis logic/routine 118 monitors the collected data, identifies a known risk or a new/emerging type of risk, and generates risk pattern reports and/or prompts risk pattern alerts. The known risk or a new/emerging risk type is identified by analyzing behavior/transaction data 210, 310; claims data 290, 390; and/or the negative file data 270, 370. In some embodiments of the invention, at least one of the following data elements are also included in the detection of new/emerging risk patterns: product data 220, 320; account data 230, 330; channel data 240, 340; asset and liability data 250, 350; customer data 260, 360 and counterparty data 280, 380. According to specific embodiments, the risk pattern analysis logic/routine 118 is configured to generate industry-wide reports, as well as reports for individual financial institutions or non-financial institutions. In addition to pattern reporting, risk pattern analysis logic/routine 118 may be further configured to prompt generation and communication of risk pattern alerts to designated entities who can then take appropriate action. For example, if risk pattern data shows high correlation of fraud activity coming from customers who take out cash advances against credit cards while concurrently overdrawing their checking accounts, designated entities may receive an alert/report outlining the new risk pattern and, in some embodiments, the probability of loss and/or recoverability associated with this risk pattern.

Further embodiments of the risk evaluating module 400 include previously mentioned risk health logic/routine 120 that is configured to determine an industry-wide risk health indicator and/or risk health indicator for a segment of an industry, examples of segments, include luxury autos (auto industry); extended stay hotels (lodging industry); credit unions in Ohio (versus all of the United States financial institutions) or the like. The risk health indicator, which may be configured as a score or the like, provides an indication of how well the industry, segment of the industry or customer is managing risk (e.g., detecting, preventing, mitigating, recovering, etc.).

According to other specific embodiments, the risk evaluating module 400, leveraging data from the risk database 100, also includes economic-trends analysis logic/routine 122. The economic-trends analysis logic/routine 122 monitors the collected data, identifies trends beyond that of fraud/risk which relate to economic health and generates reports. In some embodiments of the invention, the economic-trends analysis logic/routine 122 may include tools to monitor market risk. In other embodiments of the invention, the economic-trends analysis logic/routine 122 may generate historical economic activity reports and/or economic forecasts at segment, industry and geographic levels.

According to further specific embodiments, the risk evaluating module 400 also includes previously described suspicious activity monitoring logic/routine 126. As noted, the suspicious activity monitoring logic/routine 126 monitors customers' transactions, accounts and personal information and sends identity-theft alerts when suspicious behavior is identified. The suspicious activity monitoring logic/routine 126, because it has access to all of the data 200 and 300 in the centralized risk database 100, provides more comprehensive protection than currently employed identity-theft prevention systems provided by credit bureaus, which are generally limited to credit products/data and do not include credit card transaction data. In specific embodiments, the suspicious activity monitoring logic/routine 126 is configured to monitor transactions and asset/liability accounts and balances across multiple products and multiple financial institutions, including deposit and investment transactions and balances, which are not generally reported to a credit bureau.

According to still further embodiments, the risk evaluating module 400 may also include risk-report logic/routine 130. The risk-report logic/routine 130 provides risk reports that include an individual's, a business' or a segment of the business' history of risk/fraud. For example, according to certain embodiments, risk reports may be configured to be similar to credit reports, except risk reports emphasize risk-related information. Risk reports may be used to develop an identity score or other identity authentication capabilities based upon the data collected regarding their financial behaviors, demographics and non-financial behaviors (e.g., calling behavior; Internet surfing behavior and the like).

According to other specific embodiments, the risk evaluating module 400 also includes a target marketing logic/routine 132. The target marketing logic/routine 132 is configured to monitor the collected data, identify customers who meet specific risk, behavioral and/or likely profitability specifications and generate target marketing lists or reports. The target marketing logic/routine 132 can also generate segmentation models for the purposes of marketing to customers based on their assets, net worth, behaviors, likely profitability and/or risk attributes.

Moreover, in other embodiments, the risk evaluating module 400 may also include recovery logic/routine 134. The recovery logic/routine 134 is configured to leverage the financial information data and the non-financial institution data in recovery activities, such as providing data and analytic support to the legal process, identifying parties involved in the risk event, recovering lost funds from appropriate parties and the like.

Figure 7:
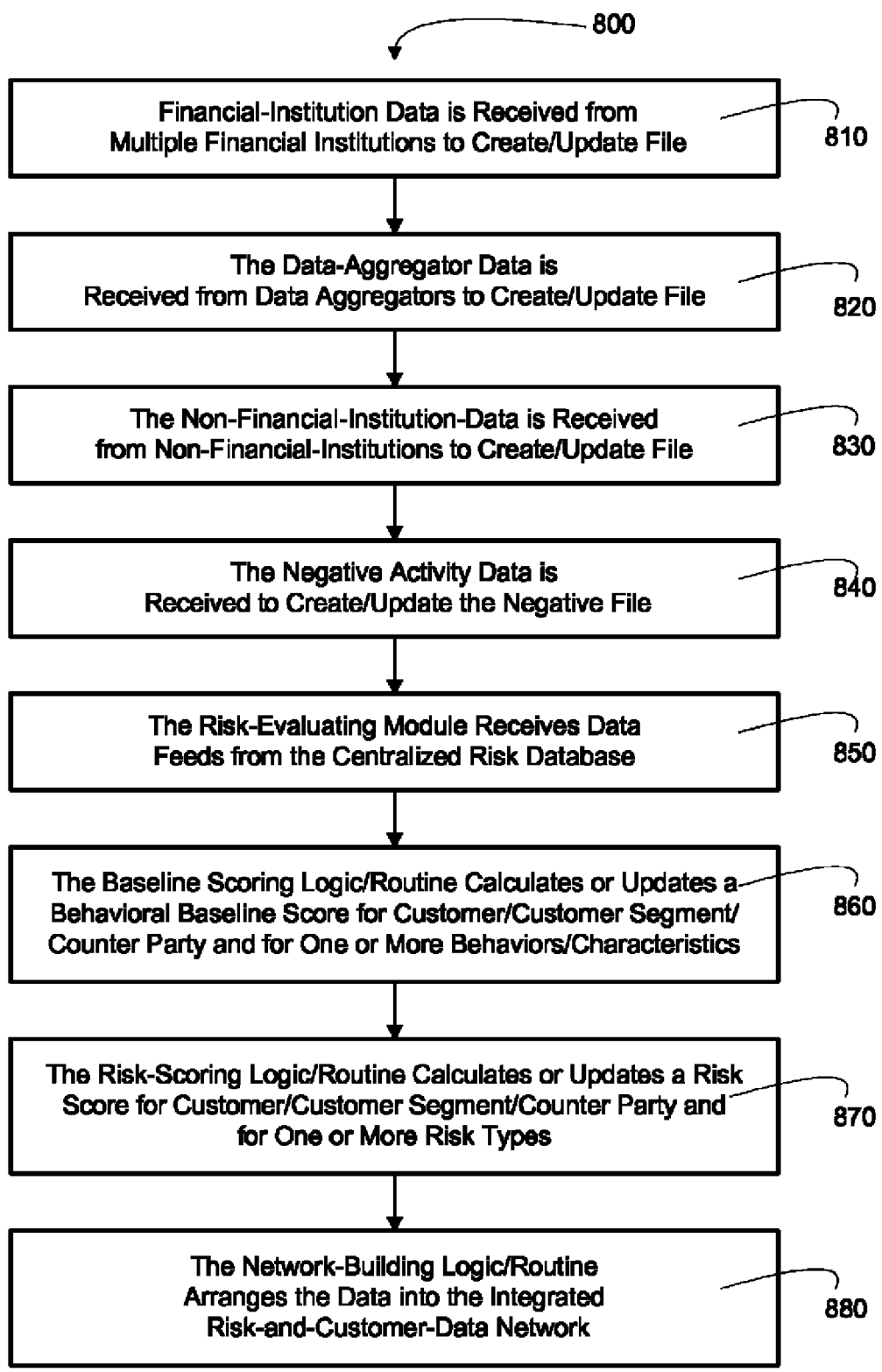
FIG. 7 is a flow diagram of a method for creating an integrated risk and customer data network, in accordance with an embodiment of the present invention.

FIG. 7 is a flow diagram of a method 800 for configuring a risk database and implementing the database in risk evaluations, in accordance with an embodiment of the present invention. At Event 810, the financial institution data 200 is received from multiple financial institutions. As provided above, financial institutions may provide one or more of the following: behavior/transaction data 210, product data 220, account data 230, channel data 240, asset & liability data 250, customer data 260, negative file data 270, counterparty data 280 and claims data 290.

At Event 820, data is received in the risk database 100 from one or more third party data aggregators 30. As provided above, the data aggregators may provide any and/or all of the same types of data provided by the financial institutions and/or the non-financial institution entities. At Event 830, non-financial institution data 300 is received from non-financial institutions. As provided above, non-financial institution data may include behavior/transaction data 310, product data 320, account data 330, channel data 340, asset and liability data 350, customer data 360, negative file data 370, counterparty data 380 and claims data 390.

At Event 840, negative file data 270 and 370 are received from multiple financial institutions, non-financial institutions, data aggregators and the like to create or update the negative file. As previously noted, the negative file may include names of high risk entities (e.g., fraud perpetrators, criminals, defaulters, etc.), as well as addresses, telephone numbers, social security numbers, tax identification numbers, IP addresses, device identifiers, biometric data that have been associated with high risk individuals or proven to be counterfeit, and the like.

Next, at Event 850, the risk evaluating module 400 receives data feeds from, or otherwise accesses, the risk database that includes data collected from multiple financial institutions, data aggregators, and non-financial institutions. The data may include, but is not limited to, the financial institution data 200 and the non-financial institution data 300. The data 200 and 300 may be downloaded periodically, or on a predetermined schedule, or on an as-needed basis, or the risk evaluating module 400 may be configured to receive real-time feeds of the data 200 and 300.

Next, at Event 860, the behavioral baseline scoring logic/routine 106 calculates or updates a behavioral-based behavioral baseline score for each customer and/or customer segments and/or counterparties and for one or more behaviors based on the data provided in centralized risk database 100. For example, to determine a behavioral-based behavioral baseline score for a customer, the behavioral baseline scoring logic/routine 106 may filter and/or search the risk database 100 to determine which financial institutions are associated with the customer and then identify the accounts related to the customer within each financial institution. In addition, the behavioral baseline scoring logic/routine 106 may search the transactional data associated with the identified customer to identify debit patterns, deposit patterns, debit-card-purchase patterns, wire-transfers patterns, cellular telephone calling patterns, internet surfing patterns and the like. The behavioral baseline scoring logic/routine 106 develops a behavioral baseline scores for the customers, customer segments and/or counterparties based on the identified patterns.

At Event 870, the risk score logic/routine 108 calculates risk scores for each customer and/or customer segment and/or counterparty based on the data in the centralized risk database 100. According to some embodiments, the risk score logic/routine 108 monitors the customer's data for risk pattern data 34 and then calculates the customer's risk score based, at least in part, on whether any risk pattern data 34 were identified, the mix and frequency of the risk pattern data 34 and the probability of loss associated with each risk pattern data 34 identified.

At Event 880, the network building logic/routine 102 is executed to format and correlate the data 200 and 300, as well as the behavioral baseline scores and risk scores, and then arranges the data into the integrated risk and customer data network 500 such that the data 200, and 300 and the baseline and risk scores are organized according to customer/customer segment, counterparty or the like. In some embodiments of the invention, integrated risk and customer data can also organize data 200 and 300 and, where appropriate the behavioral baseline and risk scores, by other defining traits such as product, channel, geography, network and the like.

Figure 8:
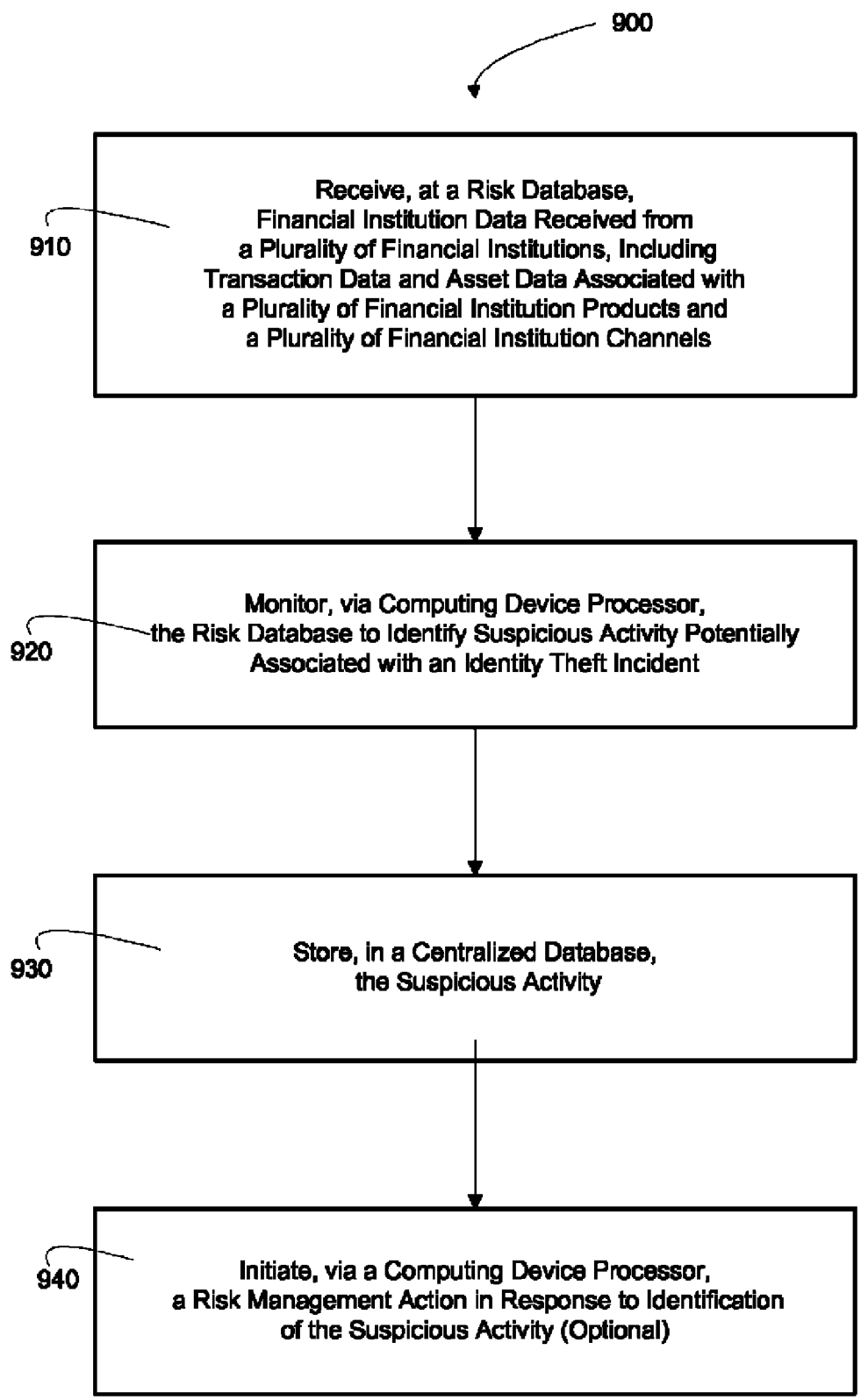
FIG. 8 is a flow diagram of a method for risk assessment and management, according to embodiments of the present invention.

FIG. 8 provides another flow diagram of a method 900 for risk assessment and management, in accordance with embodiments of the present invention. At Event 910, financial institution data, associated with a plurality of financial institutions is received at a centralized risk database 100. In specific embodiments, the financial institution data includes transaction data and/or asset data. In accordance with further embodiments, the financial institution data is associated with a plurality of financial institution products and/or a plurality of financial institution channels. In specific embodiments of the invention, non-financial institution data from one or more non-financial institutions, and/or data aggregator data from one or more data aggregators are additionally received in the centralized risk database 100.

At Event 920, the risk database 100, including at least one of asset data, such as deposit data or securities/investment data or transaction data, is monitored to identify a suspicious activity potentially associated with an identity theft incident. In specific embodiments of the invention, the monitored financial institution data may include one or more of, and in some embodiments all of, behavioral data, account data, credit data, customer data, negative file data and/or biometric data. In those embodiments in which the centralized database receives non-financial institution data, monitoring may include the non-financial institution data, including one or more of, and in some embodiments all of, transaction data, credit data, behavioral data, account data, customer data, negative file data and/or biometric data. At Event 930, in response to identification of a suspicious activity potentially associated with an identity theft incident, the suspicious activity is stored in the centralized database 100.

At optional Event 940, risk management action is initiated based on the suspicious activity and/or confirmation of an identity theft incident associated with the suspicious activity. In specific embodiments of the method, the risk management action may include generating and initiating communication of a suspicious activity alert and/or identity theft alert and/or a suspicious activity report and/or an identity theft report based on one or more suspicious activities and/or confirmed identity theft incidents. The suspicious activity alert, identity theft alert or associated reports may be communicated to one or more predetermined entities, such as financial institutions, businesses, government agencies, the affected customer or the like. The alert provides for real-time notification of a potential identity theft incident or a confirmed identity theft incident, while the suspicious activity report and identity theft report provides ongoing notice, such as weekly, monthly notice or the like, of customer activities that may or may not have been authorized that occurred during the previous report period and notice of confirmed identity theft incidents.

Thus, present embodiments disclosed in detail above provide for monitoring financial institution data from a plurality of financial institutions, including one or more of asset data, such as deposit data or investment data, transaction data, customer data to identify suspicious activity incidents potentially associated with identity theft incidents and, in specific embodiments, communicate suspicious activity alerts and/or identity theft alerts and/or associated reports in response to identifying suspicious activities potentially associated with the identity theft incidents, or confirmation of an identity theft incident. In further embodiments, the monitored financial institution may include one or more, and in some embodiments all of, behavioral data, account data, credit data, customer, negative or biometric data. In addition, in certain embodiments, the monitored data may include non-financial institution data from one or more non-financial institutions, such as merchants, Telcos, ISPs or the like. The non-financial institution data may include, but is not limited to, transaction data, account data, behavioral data, credit data, customer data, negative file data, device data and/or biometric data.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus for risk management, the apparatus comprising:
   a computing platform including at least one processor and a memory;
   a risk database stored in the memory and configured to receive financial institution data, from a plurality of financial institutions via a network, wherein the financial institution data includes negative file data and transaction data associated with a plurality of financial institution products and a plurality of financial institution channels, and wherein the financial institution data includes risk patterns correlated with suspicious activity and identity theft incidents; and
   a suspicious activity monitoring routine stored in the memory, executable by the processor and configured to (1) analytically monitor the financial institution data and, as a result of the monitoring, identify suspicious activity and theft incident, (2) receive an identity theft query and determine, based on the query, whether a queried one of a transaction, a person or an entity represents a likely identity theft incident; and (3) initiate a risk management action in response to identification of the suspicious activity or in response to confirmation of the likely identity theft incident.

2. The apparatus of claim 1, wherein the risk database is further configured to receive the financial institution data and wherein the financial institution data includes customer account data.

3. The apparatus of claim 2, wherein the risk database is further configured to receive the financial institution data and wherein the customer account data includes account opening data and account closing data.

4. The apparatus of claim 1, wherein the risk database is further configured to receive the financial institution data and wherein the financial institution data includes asset data.

5. The apparatus of claim 4, wherein the risk database is further configured to receive the financial institution data and wherein the asset data includes deposit data and investment data.

6. The apparatus of claim 1, wherein the risk database is further configured to receive the financial institution data and wherein the financial institution data includes liability data.

7. The apparatus of claim 6, wherein the risk database is further configured to receive the financial institution data and wherein the liability data includes outstanding credit data, credit limit data and credit payment data.

8. The apparatus of claim 1, wherein the risk database is further configured to receive the financial institution data, wherein the financial institution data includes customer biometric data.

9. The apparatus of claim 1, wherein the risk database is further configured to receive the financial institution data and wherein the financial institution data includes customer data.

10. The apparatus of claim 1, wherein the risk database is further configured to receive non-financial institution data from one or more non-financial institution entities and the suspicious activity monitoring routine is further configured to analytically monitor the non-financial institution data to identify suspicious activity potentially associated with an identity theft incident.

11. The apparatus of claim 10, wherein the risk database is further configured to receive the non-financial institution data from the one or more non-financial institution entities, wherein the entities include one or more of merchants, businesses, utilities, government agencies, health care organizations, social networks, telephone service providers or Internet service providers.

12. The apparatus of claim 10, wherein the risk database is further configured to receive the non-financial institution data and wherein the non-financial institution data includes one or more of transaction data, product data, channel data, account data, credit data, asset data, customer data, device data or biometric data.

13. The apparatus of claim 10, wherein the risk database is further configured to receive the financial institution data and the non-financial institution data from one or more data aggregators.

14. The apparatus of claim 1, wherein the risk database is further configured to receive linking data that links the data received in the risk database to one or more customers.

15. The apparatus of claim 1, wherein the suspicious activity monitoring routine is further configured to receive an identity validation query from at least one of a financial institution, non-financial institution entity or a customer to validate a person's or an entity's identity.

16. The apparatus of claim 1, wherein the suspicious activity monitoring routine is further configured to generate and initiate communication of a suspicious activity alert based on an identified suspicious activity potentially associated with an identity theft incident.

17. The apparatus of claim 16, wherein the suspicious activity monitoring routine is further configured to generate and initiate communication of the suspicious activity alert to one or more of financial institutions, non-financial institutions or customers.

18. The apparatus of claim 1, wherein the suspicious activity monitoring routine is further configured to generate and initiate communication of an identity theft alert based on confirmation that the suspicious activity is associated with an identity theft incident.

19. The apparatus of claim 18, wherein the suspicious activity monitoring routine is further configured to generate and initiate communication of the identity theft alert to one or more of financial institutions, non-financial institutions or customers.

20. The apparatus of claim 1, wherein the suspicious activity monitoring routine is further configured to generate and initiate communication of a suspicious activity report based on one or more identified suspicious activities.

21. The apparatus of claim 1, wherein the suspicious activity monitoring routine is further configured to generate and initiate communication of an identity theft report based on confirmation of one or more identity theft incidents.

22. A method for risk management, the method comprising:
   receiving, at a risk database stored in computing device memory, financial institution data from a plurality of financial institutions communicated via a network, wherein the financial institution data includes negative file data and transaction data associated with a plurality of financial institution products and a plurality of financial institution channels, and wherein the financial institution data includes risk patterns correlated with suspicious activity and identity theft incidents;

monitoring, via a computing device processor, the financial institution data in the risk database and, as a result of the monitoring, identify a suspicious activity and identity theft incident;

receiving, via a computing device processor, an identity theft query and, based on the query, determining whether a queried one of a transaction, a person or an entity represents a likely identity theft incident; and initiating, via a computing device processor, a risk management action in response to identification of the suspicious activity or in response to confirmation of the likely identity theft incident.

23. The method of claim 22, wherein receiving further comprises receiving, at the risk database stored in computing device memory, the financial institution data including customer account data.

24. The method of claim 23, wherein receiving further comprises receiving, at the risk database stored in computing device memory, the financial institution data including the customer account data, wherein the customer account data includes account opening data and account closing data.

25. The method of claim 22, wherein receiving further comprises receiving, at the risk database stored in computing device memory, the financial institution data including customer asset data.

26. The method of claim 25, wherein receiving further comprises receiving, at the risk database stored in computing device memory, the financial institution data including the customer asset data, wherein the customer asset data includes deposit data and investment data.

27. The method of claim 22, wherein receiving further comprises receiving, at the risk database stored in computing device memory, the financial institution data including customer liability data.

28. The method of claim 27, wherein receiving further comprises receiving, at the risk database stored in computing device memory, the financial institution data including the customer liability data, wherein the customer liability data includes outstanding credit data, credit limit data and credit payment data.

29. The method of claim 22, wherein receiving further comprises receiving, at the risk database stored in computing device memory, the financial institution data including customer biometric data.

30. The method of claim 22, wherein receiving further comprises receiving, at the risk database stored in computing device memory, the financial institution data including customer data.

31. The method of claim 22, wherein receiving further comprises receiving non-financial institution data from one or more non-financial institution entities, and monitoring further comprises monitoring the non-financial institution data to identify suspicious activity potentially associated with an identity theft incident.

32. The method of claim 31, wherein receiving further comprises receiving non-financial institution data from one or more non-financial institution entities wherein the non-financial institution entities include one or more of merchants, businesses, utilities, government agencies, health care organizations, social networks, telephone service providers or Internet service providers.

33. The method of claim 31, wherein receiving further comprises receiving the non-financial institution data, including at least one of transaction data, product data, channel data, account data, credit data, asset data, customer data, device data or biometric data.

34. The method of claim 31, wherein receiving further comprises receiving, at the risk database stored in computing device memory, the financial institution data and the non-financial institution data from one or more data aggregators.

35. The method of claim 22, wherein receiving further comprises receiving linking data that links the data received in the risk database to one or more customers.

36. The method of claim 22, further comprising receiving an identity validation query from at least one of a financial institution, non-financial institution entity or a customer and validating a person's or entity's identity based on the query.

37. The method of claim 22, wherein initiating further comprises generating and initiating communication of a suspicious activity alert based on an identified suspicious activity potentially associated with an identity theft incident.

38. The method of claim 37, wherein generating further comprises generating and initiating communication of the suspicious activity alert to one or more of financial institutions, non-financial institutions or customers.

39. The method of claim 22, wherein initiating further comprises generating and initiating communication of an identity theft alert based on confirmation that the suspicious activity is associated with an identity theft incident.

40. The method of claim 39, wherein generating further comprises generating and initiating communication of the identity theft alert to one or more of financial institutions, non-financial institutions or customers.

41. The method of claim 22, wherein initiating further comprises generating and initiating communication of a suspicious activity report based on one or more identified suspicious activities potentially associated with one or more identity theft incidents.

42. The method of claim 22, wherein initiating further comprises generating and initiating communication of an identity theft report based on confirmation of one or more identity theft incidents.

43. A computer program product comprising:
a non-transitory computer-readable medium having stored therein instructions executable by a computing device processor, wherein the instructions are executable to:
receive financial institution data from a plurality of financial institutions via a network, wherein the financial institution data includes transaction data associated with a plurality of financial institution products and a plurality of financial institution channels, and wherein the financial institution data includes risk patterns correlated with suspicious activity and identity theft incidents;
monitor the financial institution data in the risk database to result in identification of a suspicious activity and an identity theft incident;
receive an identity theft query and, based on the query, determining whether a queried one of a transaction, a person or an entity represents a likely identity theft incident; and
initiate a risk management action in response to identification of the suspicious activity or in response to confirmation of the likely identity theft incident.

44. The computer program product of claim 43, wherein the instructions executable to receive are further executable to receive the financial institution data, including customer account data.

45. The computer program product of claim 3, wherein the instructions executable to receive are further executable to receive the financial institution data, including the customer account data, wherein the customer account data includes account opening data and account closing data.

46. The computer program product of claim 43, wherein the instructions executable to receive are further executable to receive the financial institution data, including customer asset data.

47. The computer program product of claim 46, wherein the instructions executable to receive are further executable to receive the financial institution data, including the customer asset data, wherein the customer asset data includes deposit data and investment data.

48. The computer program product of claim 43, wherein the instructions executable to receive are further executable to receive the financial institution data, including customer liability data.

49. The computer program product of claim 48, wherein the instructions executable to receive are further executable to receive the financial institution data, including the customer liability data, wherein the customer liability data includes outstanding credit data, credit limit data and credit payment data.

50. The computer program product of claim 43, wherein the instructions executable to receive are further executable to receive the financial institution data, including customer biometric data.

51. The computer program product of claim 43, wherein the instructions executable to receive are further executable to receive the financial institution data, including customer data.

52. The computer program product of claim 43, wherein the instructions executable to receive are further executable to receive non-financial institution data from one or more non-financial institution entities, and wherein the instructions executable to monitor are further executable to monitor the non-financial institution data to identify suspicious activity potentially associated with an identity theft incident.

53. The computer program product of claim 52, wherein the instructions executable to receive are further executable to receive non-financial institution data from one or more non-financial institution entities and wherein the non-financial institution entities include one or more of merchants, businesses, utilities, government agencies, health care organizations, social networks, telephone service providers or Internet service providers.

54. The computer program product of claim 52, wherein the instructions executable to receive are further executable to receive the non-financial institution data, including at least one of transaction data, product data, channel data, account data, credit data, asset data, customer data, device data or biometric data.

55. The computer program product of claim 52, wherein the instructions executable to receive are further executable to receive the financial institution data and the non-financial institution data from one or more data aggregators.

56. The computer program product of claim 43, wherein the instructions executable to receive are further executable to receive linking data that links data received in the risk database to one or more customers.

57. The computer program product of claim 43, further comprising instructions executable to receive an identity validation query from at least one of a financial institution, non-financial institution entity or a customer, and instructions executable to validate a person's or an entity's identity based on the query.

58. The computer program product of claim 43, wherein the instructions executable to initiate are further executable to generate and initiate communication of a suspicious activity alert based on an identified suspicious activity potentially associated with an identity theft incident.

59. The computer program product of claim 56, wherein the instructions executable to initiate are further executable to generate and initiate communication of the suspicious activity alert to one or more of financial institutions, non-financial institutions or customers.

60. The computer program product of claim 43, wherein the instructions executable to initiate are further executable to generate and initiate communication of an identity theft alert based on a confirmation of an identity theft incident.

61. The computer program product of claim 57, wherein the instructions executable to initiate are further executable to generate and initiate communication of the identity theft alert to one or more of financial institutions, non-financial institutions or customers.

62. The computer program product of claim 43, wherein the instructions executable to initiate are further executable to generate and initiate communication of a suspicious activity report based on one or more identified suspicious activities potentially associated with one or more identity theft incidents.

63. The computer program product of claim 43, wherein the instructions executable to initiate are further executable to generate and initiate communication of an identity theft report based on confirmation of one or more identity theft incidents.

* * * * *

UNITED STATES PATENT AND TRADEMARK OFFICE
CERTIFICATE OF CORRECTION

PATENT NO.         : 8,412,605 B2                          Page 1 of 1
APPLICATION NO.    : 12/916234
DATED              : April 2, 2013
INVENTOR(S)        : Maura Louise Griffin et al.

It is certified that error appears in the above-identified patent and that said Letters Patent is hereby corrected as shown below:

In the Claims:

Column 37, Claim 45, Line 5:

Please correct claim dependency of Claim 45 from [[3]] to --"43"-- to read as follows:

-- The computer program product of claim 43, wherein the instructions executable to receive are further executable to receive the financial institution data, including the customer account data, wherein the customer account data includes account opening data and account closing data. --

Signed and Sealed this
Seventeenth Day of September, 2013

Teresa Stanek Rea
*Deputy Director of the United States Patent and Trademark Office*